United States Patent
Choi et al.

(10) Patent No.: US 11,606,015 B2
(45) Date of Patent: Mar. 14, 2023

(54) LINEAR MOTOR AND LINEAR COMPRESSOR HAVING SAME

(71) Applicant: LG ELECTRONICS INC., Seoul (KR)

(72) Inventors: Kichul Choi, Seoul (KR); Eonpyo Hong, Seoul (KR); Jaebeum Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 169 days.

(21) Appl. No.: 16/971,959

(22) PCT Filed: Feb. 21, 2019

(86) PCT No.: PCT/KR2019/002143
§ 371 (c)(1),
(2) Date: Aug. 21, 2020

(87) PCT Pub. No.: WO2019/164303
PCT Pub. Date: Aug. 29, 2019

(65) Prior Publication Data
US 2020/0395836 A1 Dec. 17, 2020

(30) Foreign Application Priority Data
Feb. 23, 2018 (KR) .................. 10-2018-0022010
Feb. 15, 2019 (KR) .................. 10-2019-0018073

(51) Int. Cl.
*H02K 41/03* (2006.01)
*F04B 35/04* (2006.01)
(Continued)

(52) U.S. Cl.
CPC ........... *H02K 41/03* (2013.01); *F04B 35/045* (2013.01); *F04B 39/0016* (2013.01);
(Continued)

(58) Field of Classification Search
CPC ........ H02K 35/00; H02K 35/02; H02K 35/04; H02K 33/00; H02K 33/16; H02K 39/00; H02K 41/00; H02K 41/03
See application file for complete search history.

(56) References Cited

U.S. PATENT DOCUMENTS

| 10,205,370 B2 | 2/2019 | Hong et al. |
| 2005/0225181 A1 | 10/2005 | Tu et al. |

(Continued)

FOREIGN PATENT DOCUMENTS

| CN | 1618161 | 5/2005 |
| CN | 1783672 | 6/2006 |

(Continued)

OTHER PUBLICATIONS

International Search Report (with English Translation) and Written Opinion dated Jun. 20, 2019 issued in Application No. PCT/KR2019/002143.

(Continued)

*Primary Examiner* — Tran N Nguyen
(74) *Attorney, Agent, or Firm* — Ked & Associates

(57) ABSTRACT

In a linear motor and the linear compressor having the same according to the present disclosure, a plurality of magnets are coupled to a stator equipped with a winding coil, and a mover core made of magnetic material instead of a permanent magnet is provided on the mover, and by the magnetizing plurality of magnets in the same direction, the motor output can increase by increasing thrust instead of decreasing the centering force for the mover core. In addition, as it is applied to a two-pore motor, it is possible to easily control the mover core and to easily perform an assembly operation and a magnetization operation for the magnet. In addition, as the stator is made of a grain-oriented core, core loss may be reduced and the motor efficiency may be improved.

32 Claims, 23 Drawing Sheets

(51) Int. Cl.
  *F04B 39/00* (2006.01)
  *F04B 39/12* (2006.01)
  *F04B 49/06* (2006.01)
  *H02K 1/14* (2006.01)
  *H02K 1/16* (2006.01)
  *H02K 1/34* (2006.01)

(52) U.S. Cl.
  CPC .......... *F04B 39/121* (2013.01); *F04B 39/122* (2013.01); *F04B 49/06* (2013.01); *H02K 1/145* (2013.01); *H02K 1/146* (2013.01); *H02K 1/16* (2013.01); *H02K 1/34* (2013.01)

(56) References Cited

U.S. PATENT DOCUMENTS

| | | | |
|---|---|---|---|
| 2006/0093497 A1* | 5/2006 | Noh | F04B 39/0061 417/415 |
| 2006/0220473 A1 | 10/2006 | Ueda | |
| 2015/0295485 A1* | 10/2015 | Sutani | H02K 15/03 310/12.18 |
| 2017/0338726 A1 | 11/2017 | Gandel et al. | |
| 2018/0198358 A1 | 7/2018 | Jeong | |

FOREIGN PATENT DOCUMENTS

| | | | | |
|---|---|---|---|---|
| CN | 104022590 | | 9/2014 | |
| CN | 104813571 | | 7/2015 | |
| EP | 2175458 | * | 4/2010 | ............ H02K 33/00 |
| FR | 2929753 | * | 10/2009 | ............ H02K 33/16 |
| JP | H05-219710 | | 8/1993 | |
| JP | 11-341778 | | 12/1999 | |
| JP | 2005-012855 | | 1/2005 | |
| JP | 2009-261203 | | 11/2009 | |
| JP | 4830251 | | 12/2011 | |
| KR | 10-2008-0065095 | | 7/2008 | |
| KR | 10-2016-0005517 | | 1/2016 | |
| KR | 10-2016-0132665 | | 11/2016 | |
| KR | 10-2018-0088121 | | 8/2018 | |

OTHER PUBLICATIONS

Chinese Office Action issued in Application No. 201980014833.4 dated Feb. 28, 2022.
Korean Office Action dated Jun. 21, 2022 issued in KR Application No. 10-2018-0022010.
Chinese Office Action dated Sep. 20, 2022 issued in CN Application No. 201980014833.4.

* cited by examiner

LINEAR MOTOR AND LINEAR COMPRESSOR HAVING SAME

CROSS-REFERENCE TO RELATED PATENT APPLICATIONS

This application is a U.S. National Stage Application under 35 U.S.C. § 371 of PCT Application No. PCT/KR2019/002143, filed Feb. 21, 2019, which claims priority to Korean Patent Application No. 10-2018-0022010 filed Feb. 23, 2018, and Korean Patent Application No. 10-2019-0018073 filed Feb. 15, 2019, whose entire disclosures are hereby incorporated by reference.

TECHNICAL FIELD

The present disclosure relates to a linear motor in which a mover reciprocates linearly and a linear compressor having the same.

BACKGROUND ART

A linear motor is a motor in which a mover reciprocates linearly by interaction with a stator, and a linear compressor is a compressor in which a piston is coupled to a mover by employing this linear motor. Therefore, the linear compressor performs a suction stroke that the piston coupled to the mover moves to the bottom dead center (BDC) and a compression stroke that the piston coupled to the mover moves to the top dead center (TDC), while the piston reciprocates in a cylinder.

The linear motor includes a core through which magnetic flux flows, a winding coil to which a current is applied, and a magnet forming a magnetic circuit with the core and the winding coil. The core includes an inner core and an outer core, which are formed in a cylindrical shape, respectively, and are provided inside and outside, respectively, with air gaps interposed between the inner core and the outer core. The winding coil is provided on the inner core or the outer core and the magnet is coupled to the mover or the core.

The linear motor may be classified into a two-air gap motor or a one-air gap motor according to the number of air gaps provided in the core. The two-air gap motor is disclosed in Patent Document 1 (Korean Patent Publication No. 10-2016-0132665 A), and the one-air gap motor is disclosed in Patent Document 2 (Korean Patent Publication No. 10-2018-0088121 A).

In the two-air gap motor, both ends of the inner core and the outer core are spaced apart from each other to form two air gaps. Magnets are provided in both air gaps, and the mover reciprocates by the magnetic flux formed in the core.

In the one-air gap motor, one ends of the inner core and the outer core are connected, and the other ends thereof are spaced apart from each other to form one air gap. A magnet is provided in this air gap, and the mover reciprocates by the magnetic flux formed in the core.

In the linear motor as described above, since the mover reciprocates, the weight of the mover is closely related to the efficiency of the motor. In the structure in which the magnet is coupled to the mover, an Nd magnet having a high magnetic force is mainly applied. Since the Nd magnet has high magnetic power but has high prices, the manufacturing cost of motors and compressors increase. Accordingly, a ferrite magnet having low magnetic power is applied. Since the ferrite magnet has low price but requires a relatively large amount of magnet due to the low magnetic force of the ferrite magnet, the weight of the mover increases. Therefore, in a case where a ferrite magnet is applied, the magnet is coupled to the core constituting the stator, and the mover is provided with a mover core made of magnetic material to reduce the weight of the mover. An example in which a plurality of ferrite magnets magnetized in different directions from each other are applied to an outer core forming a stator in a one-gap motor is disclosed in Patent Document 2.

In addition, the stator forms a magnetic flux path formed by the current flowing through the coil and is generally made of a non-oriented material, for example, non-oriented silicon steel. Here, non-oriented means that magnetic properties hardly change according to the direction of the material. Since the direction of the magnetic flux flowing through the stator is repeatedly changed according to the position of the mover which reciprocates during the operation of the linear compressor, the stator made of a non-oriented material can provide electromagnetic force without being greatly affected by the position of the mover.

However, if the ferrite magnet is applied to the outer core constituting the stator as described above, as a plurality of magnets are magnetized in different directions from each other, the centering force to restore the mover to a magnetic path center (stator center) increases. Accordingly, there is a problem that the thrust for pushing the mover in a direction of the top dead center or the bottom dead center is weakened to deteriorate the performance of the compressor to which this motor is coupled.

In addition, in the linear motor in the prior art, there are problems that, as one air gap is eccentrically formed from the center of the magnetic path, the alpha waveform is formed to be asymmetrical, and, as the inductance increases, the control characteristics of the motor is deteriorated, and the motor efficiency is deteriorated.

In addition, in the linear motor in the prior art, there is a problem that since a magnet is mounted on the inner circumferential surface of the core, a magnetization operation for the magnet becomes difficult from each other. In particular, there is a problem that as a plurality of magnets are magnetized in different directions from each other, the magnetization operation for the magnet described above becomes more difficult.

In addition, in a conventional linear motor, the magnetic field distribution repeatedly changes according to the operating frequency. In the process of magnetizing the stator (iron core) by the magnetic field generated by the coil, energy loss occurs, and the energy loss is also called core loss. The core loss is an inevitable loss to obtain a predetermined magnetic flux density at a specific frequency, and there is a problem that the efficiency of the linear motor is further deteriorated.

DISCLOSURE

Technical Problem

An object of the present disclosure is to provide a linear motor which can improve the motor efficiency while increasing the thrust to reduce the amount of magnet used, and a linear compressor having the same.

Furthermore, the present disclosure is to provide a linear motor which fixes a plurality of magnets in the axial direction of the stator but increases the thrust for the mover by lowering the centering force formed around the magnet, and a linear compressor having the same.

Furthermore, the present disclosure is to provide a linear motor which magnetizes a plurality of magnets in the same direction to increase the thrust and at the same time, provides a core made of magnetic material between the plurality of magnets to increase the motor output while reducing the amount of magnet used, and a linear motor having the same.

Another object of the present disclosure is to provide a linear motor which can improve motor efficiency by increasing control characteristics of the motor when at least two magnets are fixed to the stator, and a linear compressor having the same.

Furthermore, the present disclosure is to provide a linear motor which can improve the alpha waveform and widen the effective stroke range of the mover to increase the control characteristics of the motor, and a linear compressor having the same.

Furthermore, the present disclosure is to provide a linear motor which can improve the alpha value and widen the effective stroke range by optimizing the length of the mover core, and a linear compressor having the same.

Another object of the present disclosure is to provide a linear motor to which the magnet is easily coupled to the stator and which, at the same time, can easily magnetize the magnet, and a linear compressor having the same.

Furthermore, the present disclosure is to provide a linear motor which is capable of easily performing a coupling operation and a magnetization operation for the magnet by coupling the magnet to the outer circumferential surface of the stator, and a linear compressor having the same.

Furthermore, the present disclosure is to provide a linear motor which couples two or more magnets to the outer circumferential surface of the stator but widens spaces between both magnets to easily perform a coupling operation and a magnetization operation, and a linear compressor having the same.

In addition, another object of the present disclosure is to provide a linear motor which can further increase the efficiency by reducing the core loss, and a linear compressor having the same.

Furthermore, the present disclosure is to provide a linear motor which is provided with a stator made of a material in which an easy direction of magnetization of crystals constituting the stator sheet is distributed in one direction, and a linear compressor having the same.

Furthermore, the present disclosure is to provide a linear motor in which a portion of the stator placed in the magnetic flux path is made of grain-oriented electrical steel to reduce core loss, and a linear compressor having the same.

Technical Solution

In order to achieve the object of the present disclosure, a linear motor in which a plurality of magnets are coupled to a stator provided with a winding coil, and the mover is provided with a mover core made of magnetic material instead of a permanent magnet, and the plurality of magnets are magnetized in the same direction, and a linear compressor having the same may be provided.

Here, the magnet may be made of a ferrite magnet.

In addition, the stator may include an outer stator and an inner stator, and the plurality of magnets may be provided by being inserted into an outer circumferential surface of the inner stator.

In addition, a core portion protruding toward the outer stator is extended to the inner stator, and the core portion may be positioned between the plurality of magnets.

In addition, the mover core may be provided within the range of the magnet.

In addition, the stator may be formed such that air gaps are located on both sides in the axial direction around the winding coil, respectively.

In addition, the plurality of magnets may be provided by being inserted into the inner circumferential surface of the stator.

In addition, a core portion protruding toward the mover may be extended from the stator, and the plurality of magnets may be located on a side surface of the core portion in an axial direction, respectively.

In addition, the mover core may be provided at a position overlapping with the contact point of the magnet and the core portion.

In addition, in order to achieve the object of the present disclosure, there may be provided a linear motor including a stator which includes an outer stator, and an inner stator provided with an air gap spaced in a radial direction inside the outer stator interposed therebetween, in which a plurality of air gaps are formed with a predetermined distance in the axial direction, a winding coil provided on the stator, a mover provided between the outer stator and the inner stator and provided with a movable core made of magnetic material to reciprocate within the air gap, and a plurality of magnets respectively fixed to the inner stator so as to be located in the plurality of air gaps, in which a central core is formed in a central portion of the stator in the axial direction, and the plurality of magnets are fixed to both sides with the central core interposed between the plurality of magnets.

Here, the plurality of magnets may be formed to have the same polarity with each other in the radial direction.

In addition, the lengths of the plurality of magnets in the axial direction may be formed to be equal to each other.

In addition, the lengths between both ends of the plurality of magnets in the axial direction may be formed to be less than or equal to the length between both ends of the outer stator in the axial direction.

In addition, each of the plurality of magnets may be formed in an annular shape.

In addition, an annular fixing groove may be formed on an outer circumferential surface of the inner stator, a portion of an annular fixing member may be inserted into the fixing groove to be supported in the axial direction, and at least one of the plurality of magnets may be supported in the axial direction by the fixing member.

Here, the central core may be formed to extend from the outer circumferential surface of the inner stator toward the outer stator in the radial direction.

In addition, at least a portion of the central core may be formed to overlap with the mover core in the radial direction when the mover moves.

In addition, the length of the central core in the axial direction may be formed less than or equal to the length of one of the plurality of magnets in the axial direction.

In addition, the height of the central core in the radial direction may be formed lower than or equal to the heights of the plurality of magnets.

Here, the central core may be formed with a predetermined separation distance from between the plurality of magnets.

In addition, the inner stator may be composed of a stator main body constituting a magnetic path and a central core extending from the stator main body, and a support surface portion for supporting each of the plurality of magnets in the axial direction may be formed to be stepped on a portion to which the stator main body and the central core is connected.

Here, the length of the mover core in the axial direction may be longer than or equal to the length of the central core in the axial direction.

Here, the length of the mover core in the axial direction may be formed longer than or equal to the length of one magnet of the plurality of magnets in the axial direction.

In addition, in order to achieve the object of the present disclosure, there may be provided a linear compressor including a casing having an inner space, a linear motor which is disposed in the inner space of the casing and in which a mover reciprocates, a piston coupled to the mover of the linear motor to reciprocate together with the mover, a cylinder into which the piston is inserted to form a compression space, a suction valve which opens and closes a suction-side of the compression space, and a discharge valve which opens and closes a discharge-side of the compressed space, in which the linear motor includes a linear motor previously described.

Here, an elastic member elastically supporting the piston in an axial direction that is a reciprocating direction may be further provided on one side of the piston in the axial direction.

In addition, in order to achieve the object of the present disclosure, there may be provided a linear motor including a stator having pole portions at both ends in the reciprocating direction, respectively, a winding coil provided between both ends of the stator, a mover provided spaced apart from the stator in the radial direction so as to be provided with a plurality of air gaps spaced apart in the axial direction between the stator and the mover and having a mover core to reciprocate to the stator; and a plurality of magnets respectively coupled to the pole portions of the stator to be located in the plurality of air gaps, in which the stator is formed with a fixed-side core protrusion extending in a direction from the pole portion toward the mover, and the magnet is coupled to a side of the fixed-side core protrusion in the axial direction.

Here, the plurality of magnets may be formed to have the same polarity with each other in the radial direction.

In addition, the length of the fixed-side core protrusion in the axial direction may be greater than or equal to the length of the magnet in the axial direction.

In addition, the fixed-side core protrusion may be formed to be eccentric toward the center of the stator at both ends of the pole portion, and the plurality of magnets may be coupled to be supported on the outer surface of the fixed-side core protrusion, respectively.

Here, the sum of the lengths of the fixed-side core protrusions and the magnets in the axial direction, which are located on both sides based on the stator center, respectively, may be formed to be equal to each other.

In addition, the lengths of the plurality of magnets in the axial direction may be equal to each other.

In addition, the lengths of the plurality of magnets in the axial direction may be formed to be different from each other.

Here, the length of the mover core in the axial direction may be formed to be larger than the length between the plurality of magnets and the contact points with each of the fixed-side core protrusions facing the plurality of magnets, respectively.

In addition, the mover core may include an inner yoke portion in the axial direction forming a magnetic path together with the stator, and a plurality of movable-side core protrusions provided with a distance in the axial direction from the inner yoke portion in the axial direction and extending toward the stator, and each of the plurality of movable-side core protrusions may be formed to overlap the contact point in the radial direction, respectively.

In addition, the movable-side core protrusion may be formed to have the same or larger length than the fixed-side core protrusion in the axial direction.

In addition, in order to achieve the object of the present disclosure, there may be provided a linear compressor including a casing having an inner space, a linear motor which is disposed in the inner space of the casing and in which a mover reciprocates, a piston coupled to the mover of the linear motor to reciprocate together with the mover, a cylinder into which the piston is inserted to form a compression space, a suction valve which opens and closes a suction-side of the compression space, and a discharge valve which opens and closes a discharge-side of the compressed space, in which the linear motor includes a linear motor previously described.

Here, an elastic member elastically supporting the piston in an axial direction may be further provided on one side of the piston in a reciprocating direction.

In addition, in order to achieve the object of the present disclosure, there may be provided a linear motor including a reciprocating mover, a driving unit having a stator and a winding coil for generating an electromagnetic force driving the mover, and a compression unit having a cylinder and a piston reciprocated in the cylinder by the mover, in which the stator is provided with at least one grain-oriented core portion which is formed so that an easy direction of magnetization is uniformly distributed to be disposed on the path of the magnetic flux formed by the winding coil, and a linear compressor having the same.

Here, the grain-oriented core portion may be made of grain-oriented electrical steel.

In addition, the stator may include an inner core fixed to an outer circumferential surface of the cylinder, and an outer core spaced apart from the inner core so as to form an air gap receiving the mover and having the grain-oriented core portion.

In addition, the grain-oriented core portion may be provided with a pair of core portions in the radial direction which are spaced apart from each other with the winding coil interposed between the pair of core portions in the radial direction and extends in a radial direction of the mover and in which the easy direction of magnetization is formed parallel to the radial direction of the mover.

In addition, the grain-oriented core portion may further include a core portion in a reciprocating direction which extends to connect a pair of core portions in the radial direction to each other in the reciprocating direction of the mover and in which the easy direction of magnetization is formed parallel to the reciprocating direction of the mover.

In addition, the pair of core portions in the radial direction may be provided with a pair of inclined surfaces inclined in opposite directions to each other to face each other at an outer circumferential side end portion, and wherein the core portion in the reciprocating direction may be provided with an inclined coupling surface formed at both end portions to be in surface contact with the pair of inclined surfaces to be coupled.

In addition, the grain-oriented core portion may further include a pair of connecting core portions coupled to the outer circumferential side end portion of the pair of core portions in the radial direction and in which the easy direction of magnetization is formed to be inclined to the easy direction of magnetization of the pair of core portions in the radial direction, and a core portion in the reciprocating direction which extends to connect the pair of connecting core portions in the reciprocating direction of the mover and in which the easy direction of magnetization is formed parallel to the reciprocating direction of the mover.

In addition, in order to achieve the object of the present disclosure, there may be provided a linear motor including a reciprocating mover, a driving unit having a stator and a winding coil for generating an electromagnetic force driving the mover, and a compression unit having a cylinder and a piston reciprocated in the cylinder by the mover, in which the stator may be provided a non-oriented core portion which forms an air gap which is spaced apart from each other in the radial direction of the mover to receives the mover and made of a non-oriented electrical steel, and a grain-oriented core portion which forms a coil receiving portion which is connected to the non-oriented electrical steel to receive the winding coil and is made of a grain-oriented electrical steel, and a linear compressor having the same.

Here, the grain-oriented core portion may be provided a pair of core portions in the radial direction which are spaced apart from each other with the winding coil interposed between the pair of core portions to extend from the non-oriented core portion in the radial direction of the mover, and in which a rolling direction is formed parallel to the radial direction, and a core portion in a reciprocating direction which extends to connect the pair of core portions in the radial direction to each other in the reciprocating direction of the piston, and in which a rolling direction is formed parallel to the reciprocating direction of the piston.

Advantageous Effect

The linear motor according to the present disclosure and the linear compressor having the same fixedly couple a plurality of magnets to the stator and magnetize the plurality of magnets in the same direction, so that the thrust increases so that motor power can increase by increasing thrust instead of reducing the centering force for the reciprocating mover core. Accordingly, it is possible to reduce the amount of the magnet used compared to the same motor output, and when using a ferrite magnet, the motor power of the desired degree can be obtained without increasing the size of the motor. In addition, when the Nd magnet is used, material cost can be reduced by reducing motor usage.

In addition, according to the present disclosure, as the outer stator is provided with pole portions on both sides around the winding coil, respectively, and the inner stator is provided with magnets on both sides with the central core interposed therebetween, the alpha waveform of the motor is formed to be symmetrical based on the center of the magnetic path. Accordingly, the effective stroke section for the mover core becomes longer, so that the mover core can be more accurately controlled, thereby improving motor performance.

In addition, according to the present disclosure, as the magnet is inserted into and coupled to the outer circumferential surface of the inner stator, it is possible to easily perform an assembly operation and a magnetization operation of the magnet. Furthermore, as a plurality of magnets spaced apart in the axial direction by the central core are magnetized in the same direction, a magnetization operation for the magnet can be further easily performed.

In addition, according to the present disclosure, in a linear motor having a mover inside the stator, as the magnet is inserted into and coupled to the inner circumferential surface of the stator, it is possible to easily perform the assembly operation and the magnetization operation for the magnet. Furthermore, as the plurality of magnets are magnetized in the same direction with the fixed-side core protrusion interposed therebetween, it is possible to more easily magnetize the magnet, and reduce the length of the mover to increase the efficiency of the motor.

In addition, according to the present disclosure, a plurality of magnets are fixedly coupled to the stator, but by magnetizing the plurality of magnets in the same direction, instead of reducing the centering force for the reciprocating mover core, the thrust increases to increase the motor output. Accordingly, it is possible to reduce the amount of the magnet used compared to the same motor output, and when using a ferrite magnet, the motor power of the desired degree can be obtained without increasing the size of the motor. In addition, when the Nd magnet is used, material cost can be reduced by reducing motor usage.

In addition, according to the present disclosure, as the outer stator is provided with pole portions on both sides around the winding coil, respectively, and the inner stator is provided with magnets on both sides with the central core interposed therebetween, the alpha waveform of the motor is formed to be symmetrical based on the center of the magnetic path. Accordingly, the effective stroke section for the mover core becomes longer, so that the mover core can be more accurately controlled, thereby improving motor performance.

In addition, according to the present disclosure, as the magnet is inserted into and coupled to the inner circumferential surface of the stator, the assembly operation and the magnetization operation of the magnet can be easily performed. Furthermore, as the plurality of magnets are magnetized in the same direction with the fixed-side core protrusion interposed therebetween, it is possible to more easily perform a magnetization operation for the magnet, and reduce the length of the mover to increase the efficiency of the motor.

In addition, according to the present disclosure, as the magnet is inserted into and coupled to the outer circumferential surface of the inner stator, it is possible to easily perform the assembly operation and magnetization operation of the magnet. Furthermore, as a plurality of magnets spaced apart in the axial direction by the central core are magnetized in the same direction, a magnetization operation for the magnet can be further easily performed.

In addition, according to the present disclosure, by providing a grain-oriented core portion in the stator, the core loss can be reduced in the repetitive magnetization process according to the operation of the drive unit. Accordingly, the efficiency of the linear motor and the linear compressor having the same can be improved.

In addition, according to the present disclosure, the stator is formed of a combination of a non-oriented electrical steel and a grain-oriented electrical steel, so that core loss can be reduced in each of a portion having a constant magnetic flux direction and a portion having a non-constant magnetic flux direction in the stator. Through this, the efficiency of the linear motor and the linear compressor having the same may be further improved.

DESCRIPTION OF DRAWINGS

FIGS. 19 to 21 are schematic views illustrating a typical linear motor for explaining a stator sheet forming a stator in a linear motor according to the present disclosure, wherein FIG. 19 is a view illustrating a section of the stator, FIG. 21 is a view illustrating a cross-section of another embodiment in the stator according to the present disclosure.

BEST MODE

Hereinafter, a linear compressor according to the present disclosure will be described in more detail with reference to the drawings. The linear compressor according to the present disclosure is provided with a linear motor to suction and compress the fluid and performs an operation of discharging the compressed fluid. The linear motor and the linear compressor according to the present disclosure may be components of a refrigeration cycle, and the fluid will be described below by taking a refrigerant circulating through the refrigeration cycle as an example.

Figure 1:
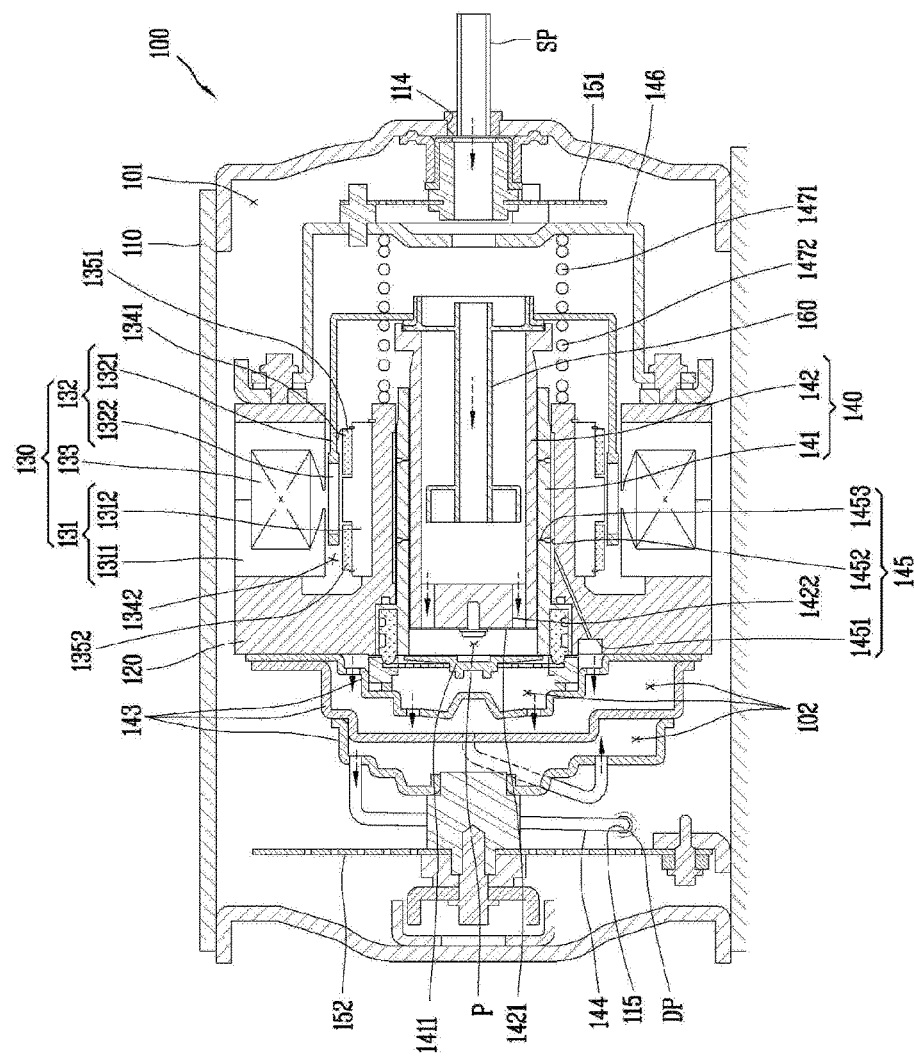
FIG. 1 is a longitudinal sectional view illustrating an embodiment of a linear compressor according to the present disclosure.

FIG. 1 is a longitudinal sectional view illustrating an embodiment of a linear compressor according to the present disclosure. Referring to FIG. 1, the linear compressor 100 of the present embodiment includes a casing 110, a frame 120, a driving unit 130, and a compression unit 140.

The casing 110 may form a sealed space. The sealed space may be the suction space 101 filled with the refrigerant which is suctioned. A suction port 114 is formed in the casing 110, and a suction pipe SP may be connected to the suction port 114. In addition, a discharge port 115 is formed in the casing 110, and a discharge pipe DP may be connected to the discharge port 115.

The frame 120 may be provided inside the casing 110 to support the driving unit 130 and the compression unit 140. The frame 120 may be connected to and supported by the other end portion of the support springs 151 and 152, which are positioned so that one end portion is fixed to the casing 110. The support springs 151 and 152 may be made of a plate spring as illustrated or may be made of a coil spring.

The driving unit 130 may serve to generate a reciprocating motion of the linear compressor 100 according to the present embodiment. To this end, the driving unit 130 may include a stator 131 and a mover 132.

The stator 131 may be coupled between the frame 120 and the back cover 146 which will be described later. The stator 131 may include an outer stator 1311 and an inner stator 1312. The mover 132 may be located between the outer stator 1311 and the inner stator 1312.

The winding coil 133 may be mounted on the outer stator 1311, and the mover 132 may include a mover core 1322 made of magnetic material in the connection frame 1321. The mover core 1322 is not a magnet meaning a permanent magnet and may be formed of a ferromagnetic material to form a magnetic circuit together with a stator 131 by a winding coil 133. Accordingly, in the driving unit 130 according to the present embodiment, a magnet 135 which is a permanent magnet, is coupled to the stator 131, not the mover 132, and the coupling structure of the magnet will be described later.

The mover 132 may be formed of a connection frame 1321 and a mover core 1322 as described above. The connection frame 1321 may be formed of a non-magnetic metal or a resin material, and the mover core 1322 may be formed by sintering a ferromagnetic material or by stacking a sheet of electrical steel.

In addition, the connection frame 1321 may be formed in a cylindrical shape to be coupled to the rear end of the piston 142. Accordingly, the connection frame 1321 reciprocates together with the piston 142.

In addition, the mover core 1322 may be formed in one ring shape, inserted into the connection frame 1321, or formed in an arc shape to be arranged in the circumferential direction of the connection frame 1321.

Meanwhile, the compression unit 140 suctions the refrigerant in the suction space 101 to compress and discharge the refrigerant. The compression unit 140 may be located at the central portion of the casing 110 toward the inside of the inner stator 1312 and includes a cylinder 141 and a piston 142. The cylinder 141 is supported by the frame 120 and may form a compression chamber P therein.

The cylinder 141 may be formed in a cylindrical shape to receive the refrigerant and the piston 142 therein and may be formed to open both ends. One end of the cylinder 141 may be closed by a discharge valve 1411, and a discharge cover 143 may be mounted outside the discharge valve 1411.

A discharge space 102 may be formed between the discharge valve 1411 and the discharge cover 143. In other words, a space in which the compression chamber P and the discharge cover 143 are separated from each other by the discharge valve 1411 may be formed. In addition, inside the casing 110, a loop pipe 144 extending to communicate with the discharge port 115 and the discharge space 102 may be installed.

Meanwhile, a portion of the refrigerant discharged into the discharge space 102 may flow into the cylinder 141 to form a gas bearing 145 that lubricates between the inner circumferential surface of the cylinder 141 and the outer circumferential surface of the piston 142. The bearing inlet 1451 constituting the inlet of the gas bearing 145 is formed through the frame 120, and the bearing passage 1452 constituting the gas bearing is between the inner circumferential surface of the frame 120 and the outer circumferential surface of the cylinder 142, and the bearing hole 1453 constituting the gas bearing may be formed by penetrating from the outer circumferential surface to the inner circumferential surface of the cylinder.

The piston 142 may be inserted into the opened other end of the cylinder 141 to seal the compression chamber P. The piston 142 may be connected to the mover 132 described above and reciprocated together with the mover 132. An inner stator 1312 and a cylinder 141 may be located between the mover 132 and the piston 142. Accordingly, the mover 132 and the piston 142 may be coupled to each other by separate connection frames 1321 provided to bypass the cylinder 141 and the inner stator 1312. The mover core 1322 described prior to the connection frame 1321 may be inserted into and coupled to the inside or attached to the outer surface to be coupled.

The internal space of the piston 142 and the compression chamber P may be communicated by the suction port 1422. In other words, when the refrigerant flowing into the inner space of the piston 142 from the suction space 101 flows through the suction port 1422, and when the suction valve 1421 opening and closing the suction port 1422 is opened by the pressure of the refrigerant, the refrigerant may be suctioned into the compression chamber P.

Meanwhile, the piston 142 may perform a resonant motion in the axial direction (the reciprocating direction) by thrust and centering force formed by the electromagnetic force of the linear motor, which is the driving unit 120, but the piston may perform resonant motion in the axial direction by the mechanical resonant spring 1471 and 1472 as in the present embodiment. Mechanical resonant springs (hereinafter abbreviated as resonant springs) 1471 and 1472 are made of a compressed coil spring and may be provided on both sides of the connection frame 1321 in the axial direction, respectively. In this case, the first resonant spring 1471 may be provided between the connection frame 1321 and the back cover 146, and the second resonant spring 1472 is provided between the connection frame 1321 and the frame 120. However, in some cases, the resonant spring may be provided on only one side based on the connection frame 1321.

The linear compressor according to the present embodiment as described above is operated as follows.

In other words, when current is applied to the winding coil 133 constituting the driving unit 130 in the clockwise or counterclockwise direction, alternating magnetic flux is formed in the stator 131 so that the mover 132 reciprocates linearly. Then, the piston 142 connected to the mover 132 increases and decreases the volume of the compression chamber P while reciprocating inside the cylinder 141.

For example, when the piston 142 is moved while increasing the volume of the compression chamber P, a suction stroke is performed in the compression chamber P. At this time, the internal pressure of the compression chamber P is reduced so that the suction valve 141*b* provided in the piston 142 is opened, and the refrigerant that has been in the suction space 101 is suctioned into the compression chamber P.

On the other hand, when the piston 142 is moved while reducing the volume of the compression chamber P, a compression stroke is performed in the compression chamber P. At this time, when the internal pressure of the compression chamber P rises and reaches a predetermined pressure, the discharge valve 1411 mounted on the cylinder 141 is opened to discharge the refrigerant into the discharge space 102.

As the suction stroke and the compression stroke of the piston 142 are repeated, the refrigerant is repeated a series of processes in which the refrigerant flows into the suction space 101 through the suction pipe SP, and the refrigerant is suctioned into the compression chamber P and compressed, and the refrigerant is discharged to the outside of the compressor through a discharge space 102, a loop pipe 144, and the discharge pipe.

Meanwhile, in the linear motor and the linear compressor having the same according to the present embodiment, the lighter the weight of the mover is, the more advantageous for the mover including the piston to reciprocate at a high speed. However, if the mover is provided with a magnet which is a permanent magnet, the weight of the mover increases, and thus there is a limit to move the mover at high speed. Moreover, when a ferrite magnet having a low magnetic flux is used, the amount of the magnet used is increased to secure the magnetic flux, and thus the weight of the mover further increases, which may decrease the efficiency of the linear motor and the linear compressor.

However, as described above, if an Nd magnet having a relatively high magnetic flux is used, it is possible to reduce the mover's weight by lowering the amount of the magnet used, but the manufacturing costs of the linear motor and the linear compressor may significantly increase compared to the effect of the mover's weight reduction due to the high price of 10 times or more compared to the price of the ferrite magnet. Therefore, in the present embodiment, a relatively inexpensive magnet such as a ferrite magnet is used, but the magnet can be coupled to the stator to lower the weight of the mover. Accordingly, in the present embodiment, the magnetic flux can be secured by increasing the surface area of the magnet while lowering the material cost for the magnet.

Meanwhile, the linear motor and the linear compressor having the same according to the present embodiment may be applied with a mechanical resonant spring made of a compressed coil spring to induce resonant motion of the mover (or piston). However, the linear motor applied to the linear compressor of the present embodiment has a magnetic resonant spring effect of a certain degree between the stator and the mover due to the characteristics of the linear motor. Therefore, the linear compressor has a mechanical resonant spring made of a compressed coil spring, so that even when strong thrust is generated, the centering force due to the magnetic resonant spring occurs together with the strong thrust. Since this centering force acts as a factor to reduce thrust, lowering the centering force may be effective to increase thrust. This may also be effective in terms of controlling to optimize the reciprocating motion of the linear motor.

In other words, as described above, when a current is applied to the winding coil of the drive unit, a magnetic flux is formed in the stator, and forces that allow the mover to reciprocate may be generated by the interaction between the magnetic flux formed by the application of the current and the magnetic flux formed by the magnet. In other words, in the stator, thrust pushing the mover to the top dead center and bottom dead center and a centering force pulling the retracted mover in the center direction of the magnetic path are generated. The thrust and the centering force are mutually opposite forces, when the centering force increases, the thrust may decrease, and when the centering force decreases, the thrust may increase. In particular, when viewed from the side surface of the linear motor and the linear compressor equipped with a mechanical resonant spring, even if the centering force is set too high, the thrust of the mover moving to the top dead center and the bottom dead center is lowered, and thus the output of the motor may be lowered as a whole.

Accordingly, in the present embodiment, the output of the motor increases by increasing the output of the motor by applying a mechanical resonant spring and, at the same time, by increasing the thrust of the motor against the mover by relocating the magnet. Here, the magnet is not necessarily limited to the ferrite series, and the magnet is not limited to not being used at all in the mover.

Figure 2:
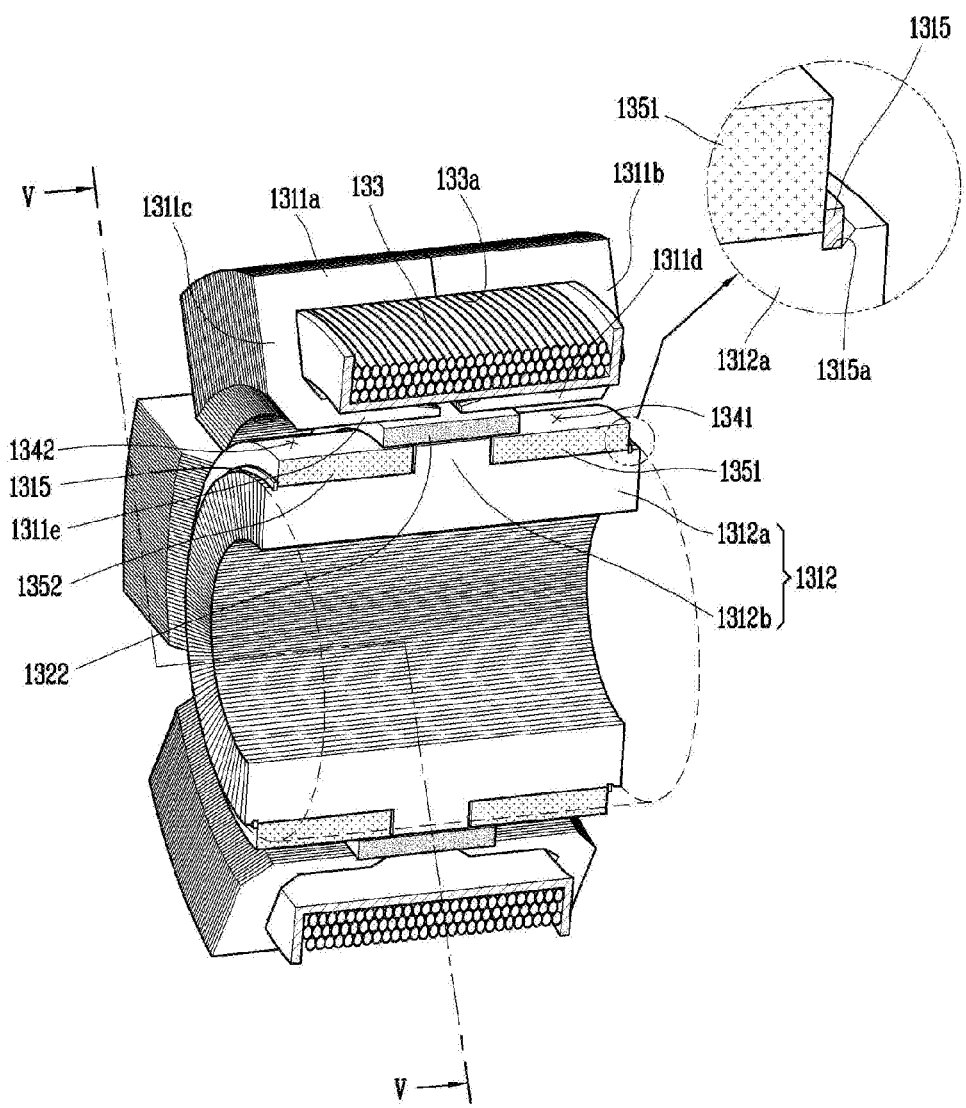
FIG. 2 is a perspective view illustrating a broken linear motor according to the present embodiment.
Figure 3:
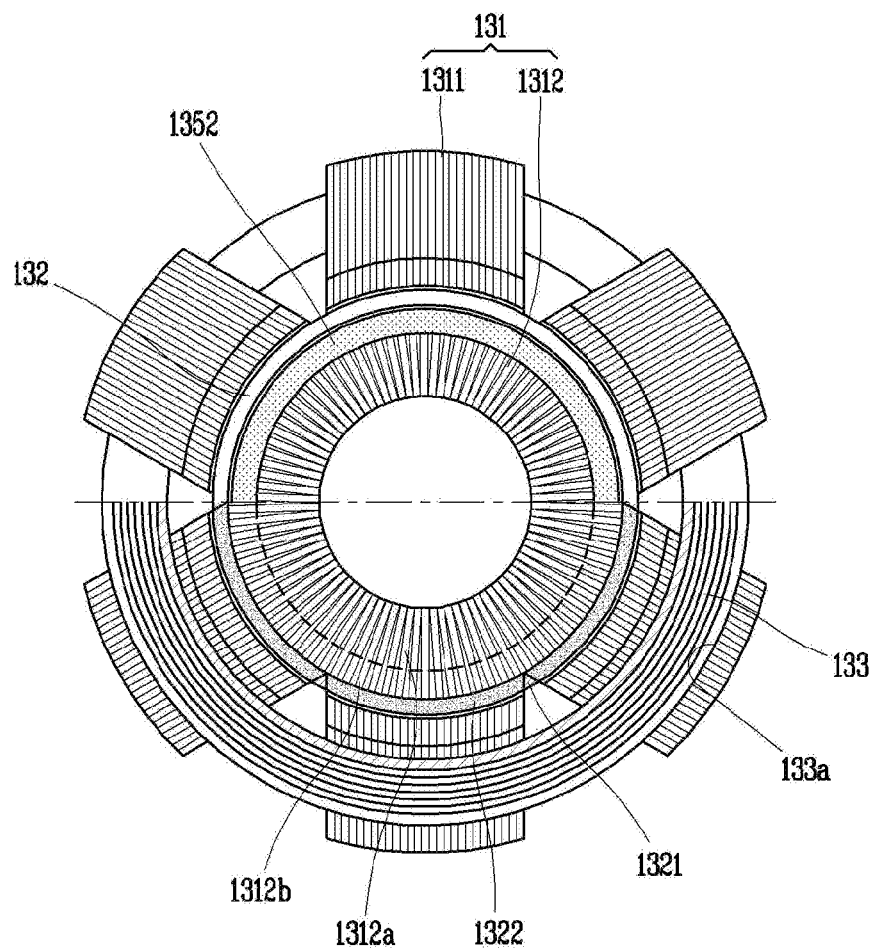
FIG. 3 is a cross-sectional view taken along line "V-V" in FIG. 2.
Figure 4:
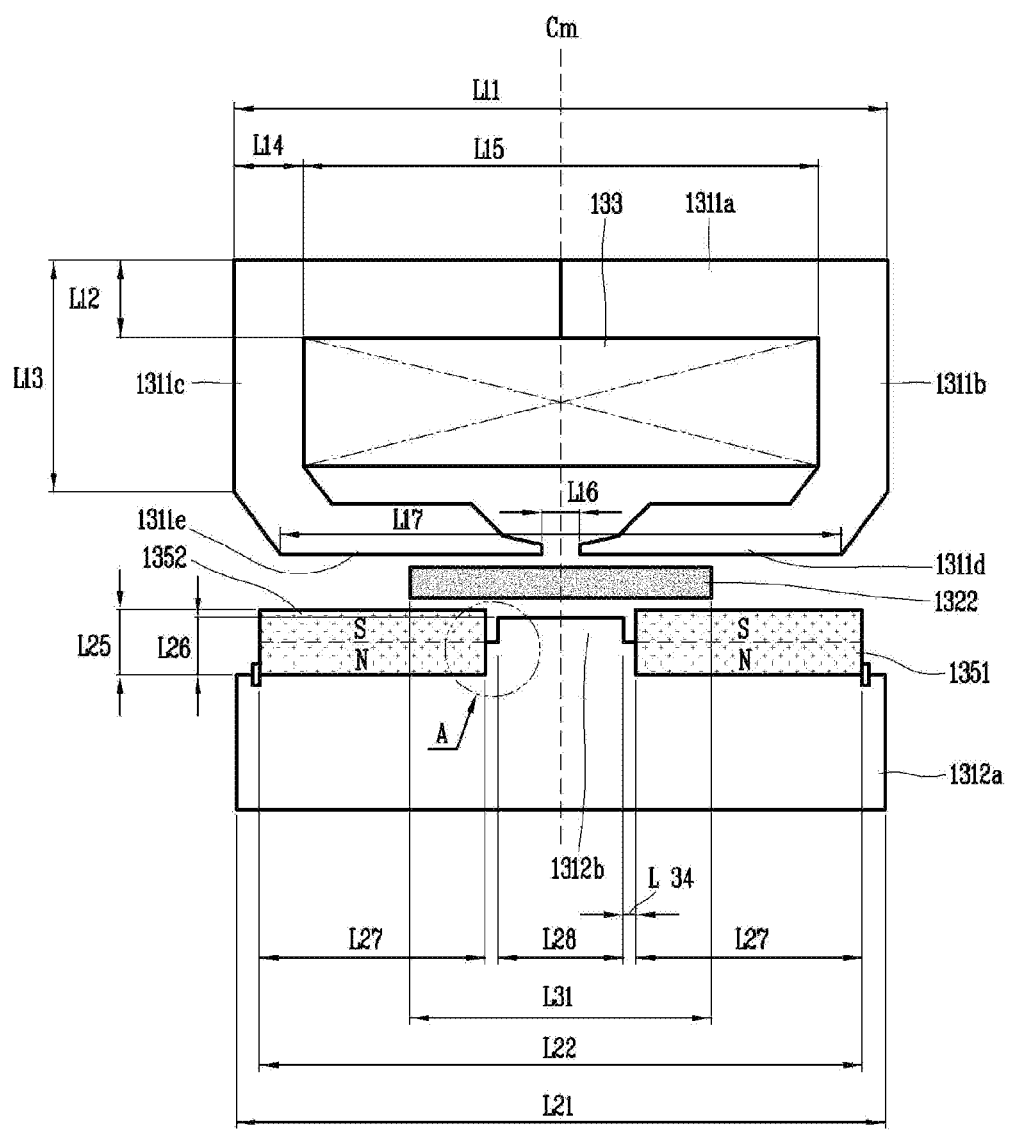
FIG. 4 is a schematic view seen from a side surface in the linear motor according to the present embodiment.

FIG. 2 is a perspective view illustrating a broken linear motor according to the present embodiment, FIG. 3 is a cross-sectional view taken along line "V-V" in FIG. 2, and FIG. 4 is a schematic view seen from a side surface in the linear motor according to the present embodiment.

Referring back to FIG. 1, the stator 131 according to the present embodiment is fixed by inserting the inner stator 1312 constituting the inner core into the outer circumferential surface of the frame 120, and the outer stator 1311 constituting the outer core may be disposed to surround the inner stator 1312 in the circumferential direction with the preset air gaps 1342 and 1342 interposed between the outer stator and the inner stator.

Referring to FIGS. 2 and 3, the outer stator 1311 and the inner stator 1312 may be disposed so that both ends thereof in the axial direction are spaced apart from each other. Accordingly, air gaps 1341 and 1342 that are a space in which the mover 132 reciprocates, is formed between the outer stator 1311 and the inner stator 1312. The air gaps 1341 and 1342 are formed on both sides in the axial direction with the winding coil 133, which will be described later, interposed between the air gaps 1341 and 1342. Here, the axial direction is a direction in which the mover reciprocates.

Referring to FIG. 4, the stator 131 is made of an outer stator 1311 and an inner stator 1312, as described above, and the outer stator 1311 and the inner stator 1312 are spaced apart from each other in the radial direction by the air gap.

The outer stator 1311 may be formed in a cylindrical shape by radially stacking a stator sheet (no reference numeral), or may form a cylindrical shape by radially stacking a plurality of stator block (no reference numeral) which is made by stacking a sheet of a stator sheet in the thickness direction as illustrated in FIGS. 2 and 3. The inner stator 1312 may be formed in a cylindrical shape by radially stacking a sheet of a stator sheet.

The outer stator 1311 may have a winding coil 133 seated in the middle in the axial direction to form a '∩' shape, and the inner stator 1312 may have a long '-' shape in the axial direction. Accordingly, the winding coil grooves 133a are formed in the middle of the outer stator 1311, and the air gaps 1341 and 1342, which are described above, on both sides of the winding coil grooves 133a may be respectively formed.

In addition, the outer stator 1311 may include an outer yoke portion 1311a in the axial direction forming the outer circumferential surface of the winding coil groove 133a, and a plurality of yoke portions in the radial direction (hereinafter, the first yoke portion in the radial direction and the second yoke portion in the radial direction) 1311b and 1311c which are connected to both ends of the outer yoke portion (1311a) in the axial direction and which are made both side surfaces in the axial direction of the winding coil groove 133a.

The outer yoke portion 1311a in the axial direction is formed long in the axial direction (the moving direction or the reciprocating direction of the mover) so that the length L11 in the axial direction of the outer yoke portion 1311a in the axial direction is formed longer than the length L12 in the radial direction (the orthogonal direction to the moving direction of the mover). The first yoke portion 1311b in the radial direction and the second yoke portion 1311c in the radial direction may be formed to be long in the radial direction, such that the length L13 in the radial direction may be formed longer than the length L14 in the axial direction.

In addition, the length L11 in the radial direction of the outer yoke portion 1311a in the axial direction is formed substantially the same as the length L13 in the axial direction of the first yoke portion 1311b in the radial direction or the second yoke portion 1311c in the radial direction, and the length L13 in the axial direction of the first yoke portion 1311b in the radial direction or the second yoke portion 1311c in the radial direction may be formed smaller than the length L15 in the axial direction of the winding coil groove 133a. The first yoke portion 1311b in the radial direction and the second yoke portion 1311c in the radial direction may be formed to be symmetrical based on the coil winding groove 133a.

Meanwhile, a first pole portion 1311d and a second pole portion 1311e forming polarities may be formed to extend at the inner circumferential side end portions of the first yoke portion 1311b in the radial direction and the second yoke portion 1311c in the radial direction, respectively. In other words, the first pole portion 1311d may be formed to extend in the first yoke portion 1311b in the radial direction and the second pole portion 1311e may be formed to extend in the second yoke portion 1311c in the radial direction.

The first pole portion 1311d is formed to extend axially from the inner circumferential side end portion of the first yoke portion 1311b in the radial direction toward the magnetic path center Cm, and the second pole portion 1311e may be formed to extend in the axial direction from the inner circumferential side end portion of the second yoke portion 1311c in the radial direction toward the magnetic path center Cm. Accordingly, the first pole portion 1311d and the second pole portion 1311e are formed to extend in a direction toward each other to be close to each other, and a space between the first pole portion 1311d and the second pole portion 1311e is spaced apart from each other to form a stator air gap 1311f.

The center of the stator air gap 1311f may be formed in the axial center of the stator 131, that is, the magnetic path center Cm, to face the central core 1312b, which will be described later, in the radial direction when the motor (or compressor) is stopped. In addition, the length L16 of the stator air gap 1311f in the axial direction may be shorter than the length L28 of the central core 1312b in the axial direction.

Meanwhile, the inner stator 1312, as described above, may be formed in a cylindrical shape by stacking a sheet of a stator sheet radially.

In addition, the inner stator 1312 may include an inner yoke portion 1312a in the axial direction constituting a magnetic path, and a central core 1312*b* protruding toward the outer stator 1311 from the center of the inner yoke portion 1312*a* in the axial direction. Accordingly, the inner circumferential surface of the inner stator 1312 may be formed to have the same diameter along the axial direction, while the outer circumferential surface may be formed to have different diameters along the axial direction. In other words, the inner circumferential surface of the inner stator 1312 is formed in a single diameter to be in close contact with the outer circumferential surface of the frame 120, while the outer circumferential surface thereof may be formed to be stepped by protruding the central core 1312*b* described above toward the outer stator 1311.

The length L21 in the axial direction of the inner yoke portion 1312*a* in the axial direction may be at least equal to or longer than the length L11 in the axial direction of the outer stator 1311. Accordingly, the length L22 between both ends of the first magnet 1351 and the second magnet 1352 in the axial direction, which will be described later, may be formed to be longer or equal to length L17 between both ends of the first pole portion 1311*d* and the second pole portion 1311*e* in the axial direction.

In addition, it may be advantageous to enlarge the effective stroke range to be described later that the length (thickness) L23 in the radial direction of the inner yoke portion 1312*a* in the axial direction is formed to be greater than or equal to the length L12 in the radial direction of the outer yoke portion 1311*a* in the axial direction.

Meanwhile, the central core 1312*b* may be formed in a rectangular shape. However, the outer end portion of the central core 1312*b* may be formed to be inclined or stepped at both edges.

Figure 5:
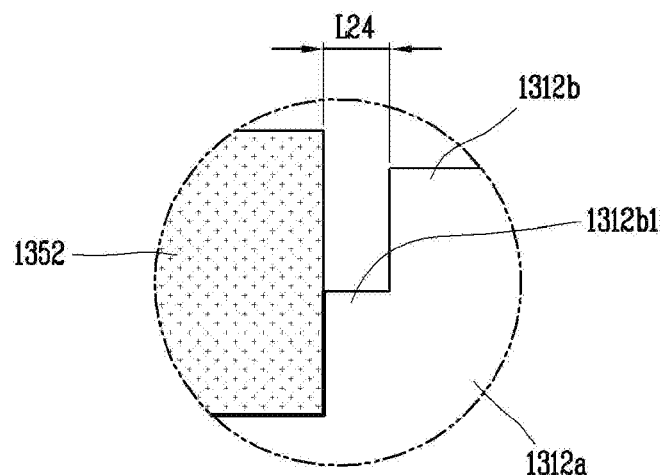
FIGS. 5 and 6 are enlarged views illustrating a portion "A" of FIG. 4 illustrated to explain a coupling relationship between the magnet and the central core in the linear motor according to the present embodiment.

In addition, the inner end portion of the central core 1312*b* may be extended from the inner yoke portion 1312*a* in the axial direction to be stepped. For example, as illustrated in FIG. 5, both side surfaces of the central core 1312*b* in the axial direction may be formed so that a support surface portion 1312*b*1 is stepped. Accordingly, a portion of the side surfaces of the magnets 1351 and 1352 facing the central core 1312*b* may be tightly in close contact with the support surface portion 1312*b*1 in the axial direction in a state of being spaced apart from the central core 1312*b*.

Figure 6:
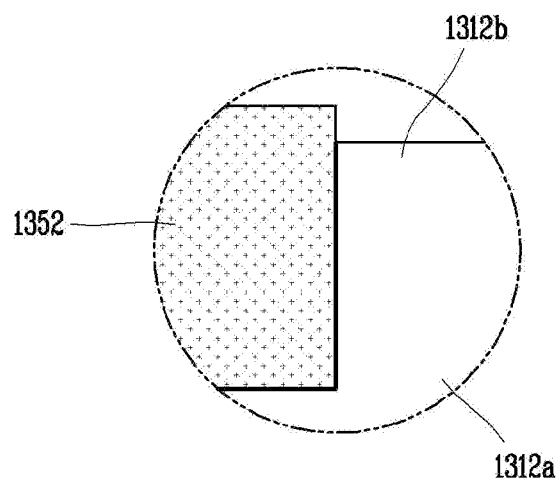

However, as illustrated in FIG. 6, both side surfaces of the central core 1312*b* in the axial direction are formed as a single straight surface, and the side surfaces of the magnets 1351 and 1352 facing the central core 1312*b* are tightly in close contact with the central core 1312*b* in the axial direction. Accordingly, the support force in the axial direction for the magnets 1351 and 1352 can increase.

In addition, the first magnet 1351 and the second magnet 1352 may be coupled to both sides of the central core 1312*b* in the axial direction, respectively. Accordingly, the first magnet 1351 and the second magnet 1352 are spaced apart from each other with the central core 1312*b* interposed between the first magnet 1351 and the second magnet 1352.

In addition, although the side surface of the central core 1312*b* in the axial direction may be in contact with the magnets 1351 and 352, as described above, the central core 1312*b* is provided with the support surface portion 1312*b*1 so that the separation distance L24 spaced apart from both magnets 1351 and 1352 in the axial direction may be formed. Accordingly, the central core 1312*b* can firmly support on one side surface in the axial direction of the magnets 1351 and 1352 while being spaced apart from both magnets 1351 and 1352. In addition, as a portion of the central core 1312*b* is spaced apart from the magnets 1351 and 1352, it is possible to suppress magnetization of the central core 1312*b* when magnetizing the magnets 1351 and 1352. The separation distance L24 between the central core 1312*b* and the magnets 1351 and 1352 may be formed to be approximately 20 to 30% compared to the thickness L25 of the magnet.

In addition, the height L26 of the central core 1312*b* may be formed to be lower than or equal to the height (thickness in the radial direction) L25 of the first magnet 1351 and the second magnet 1352. However, since the central core 1312*b* forms a passage connecting a kind of magnetic path, the central core 1312*b* may be formed higher than the height L25 of the magnet within a range which is not in contact with the mover core 1322 described later. However, since the sizes of the first air gap 1341 and the second air gap 1342 are defined by the height L25 of the magnet, the central core 1312*b* is not usually formed higher than the magnets 1351 and 1352.

In addition, it may be preferable that the central core 1312*b* is formed to have a length such that the central core 1312*b* can overlap with the mover core 1322 in the radial direction. Accordingly, the effective stroke range of the mover core 1322 can be formed wide.

In addition, the length of the central core 1312*b* in the axial direction may be formed to be smaller than or equal to the length L27 of one magnet in the axial direction among the plurality of magnets 1351 and 1352. For example, if the length L28 of the central core in the axial direction is formed longer than the length L27 of the magnet in the axial direction, the length L27 of the magnet in the axial direction will be shortened accordingly, and thus the magnetic flux density due to the characteristics of the ferrite magnet having low magnetic flux may be more lowered, and motor performance may be deteriorated. Accordingly, the length L28 of the central core in the axial direction may be formed to be smaller than or equal to the length L27 of the magnet in the axial direction. For example, it may be desirable that the length L28 of the central core in the axial direction is formed to be approximately 50 to 70% compared to the length L27 of the magnet in the axial direction.

Meanwhile, the first magnet 1351 and the second magnet 1352 may be formed in an annular shape or may be formed in an arc shape. When the magnets 1351 and 1352 are formed in an annular shape, the magnets 1351 and 1352 can be inserted into coupled to the outer circumferential surface of the inner stator 1312 and, when the magnets 1351 and 1352 are formed in an arc shape, the magnets 1351 and 1352 can be attached to and coupled to the outer circumferential surface of the inner stator 1312. Accordingly, as the magnets 1351 and 1352 are inserted into and coupled to the outer circumferential surface of the inner stator 1312, it is possible to easily perform an assembly operation and a magnetization operation of the magnets 1351 and 1352. Particularly, when the magnets 1351 and 1352 are formed in an annular shape, the magnets 1351 and 1352 can be pressed into and coupled to the outer circumferential surface of the inner stator 1312 to make it easier to assemble to the magnets.

Furthermore, as the first magnet 1351 and the second magnet 1352 spaced apart in the axial direction by the central core 1312*b* are magnetized in the same direction, it is possible to more easily magnetize the magnet.

In addition, after the first magnet 1351 and the second magnet 1352 are coupled to the inner stator 1312, the first magnet 1351 and the second magnet 1352 may be supported so as not to deviate in the axial direction. For example, as illustrated in FIG. 2, the direction toward the central core 1312*b* is supported in close contact with the support surface portions 1312*b*1 provided on both side surfaces of the central core 1312b or both side surfaces of the central core 1312b, and the opposite direction thereto may be supported in the axial direction by each fixing member 1315 coupled to the inner stator 1312. The fixing member 1315 is formed in a C-ring shape, annular fixing grooves 1315a are formed on outer circumferential surfaces of both end portions of the inner stator 1312, respectively, and each fixing member 1315 is inserted into and coupled to a fixing groove 1315a.

In addition, as illustrated in FIG. 4, the first magnet 1351 and the second magnet 1352 may be magnetized in the same direction. Accordingly, the first magnet 1351 and the second magnet 1352 have the same polarity with each other in the radial direction. For example, the inner circumferential surface of the first magnet 1351 and the inner circumferential surface of the second magnet 1352 are magnetized into N poles and the outer circumferential surface of the first magnet 1351 and the outer circumferential surface of the second magnet 1352 are magnetized into S poles so that the first magnet 1351 and the second magnet 1352 can form the magnetic force lines from the inner circumferential surface to the outer circumferential surface of the first magnet 1351 and the second magnet 1352. Accordingly, by removing or minimizing the centering force for the mover core 1322 around the first magnet 1351 and the second magnet 1352, it is possible to generate thrust only for the mover core or maximize the thrust. This will be described later.

In addition, the first magnet 1351 and the second magnet 1352 may be formed to have the same lengths L27 in the axial direction. Accordingly, the mover core 1322 reciprocates by the same distance from the magnetic path center Cm.

However, in some cases, the length L27 of the first magnet 1351 in the axial direction and the length L27 in the axial direction of the second magnet 1352 may be formed differently. For example, when the linear motor is applied to a linear compressor having one compression chamber, the length L27 of the second magnet 1352 in the axial direction close to the compression chamber P may be formed longer than the length L27 of the first magnet 1351 in the axial direction, in consideration of the piston 142 being pushed by the pressure of the compression chamber P. Alternatively, the second magnet 1352 may be disposed closer to the compression chamber based on the magnetic path center Cm. Accordingly, the piston connected to the mover core can generate a larger thrust toward the compression chamber.

In addition, the length of the magnet in the axial direction summing the length of the first magnet 1351 in the axial direction and the length of the second magnet 1352 in the axial direction may be formed to be smaller than or equal to the length of the outer stator 1311 in the axial direction summing the axial length of the first pole portion 1311d in the axial direction and the length of the second pole portion 1311e in the axial direction. For example, the length L22 from the end of the first magnet 1351 in the bottom dead center direction to the end of the second magnet 1352 in the top dead center direction may be formed to be less than or equal to the length L17 from the end of the first pole portion 1311d in the bottom dead center direction to the end of the second pole portion 1311e in the top dead center direction. Accordingly, the motor efficiency can increase by minimizing leakage of magnetic flux passing through the first magnet 1351 and the second magnet 1352.

Meanwhile, the mover core 1322, as described above, is not a magnet meaning a permanent magnet, and is sufficient as long as it is magnetic material capable of forming a magnetic circuit together with the stator 131 by a winding coil 133 such as an electrical steel.

In addition, the length of the mover core 1322 in the axial direction may be formed to be equal to or longer than the length of one magnet in the axial direction among the plurality of magnets 1351 and 1352. In addition, the length L31 of the mover core 1322 in the axial direction may be shorter than the sum of the lengths of the plurality of magnets in the axial direction. Accordingly, the mover core 1322 reciprocates according to the direction of the magnetic flux formed in the stator 1311. However, the starting point and ending point of the effective stroke are changed according to the length L31 of the mover core 1322 in the axial direction, and the alpha value is also changed. For example, as the length L31 of the mover core 1322 in the axial direction becomes shorter, the effective stroke range becomes narrower, whereas, as the length L31 of the mover core 1322 in the axial direction increases, the effective stroke range increases. This will be described later with reference to FIG. 9.

Figure 7A:
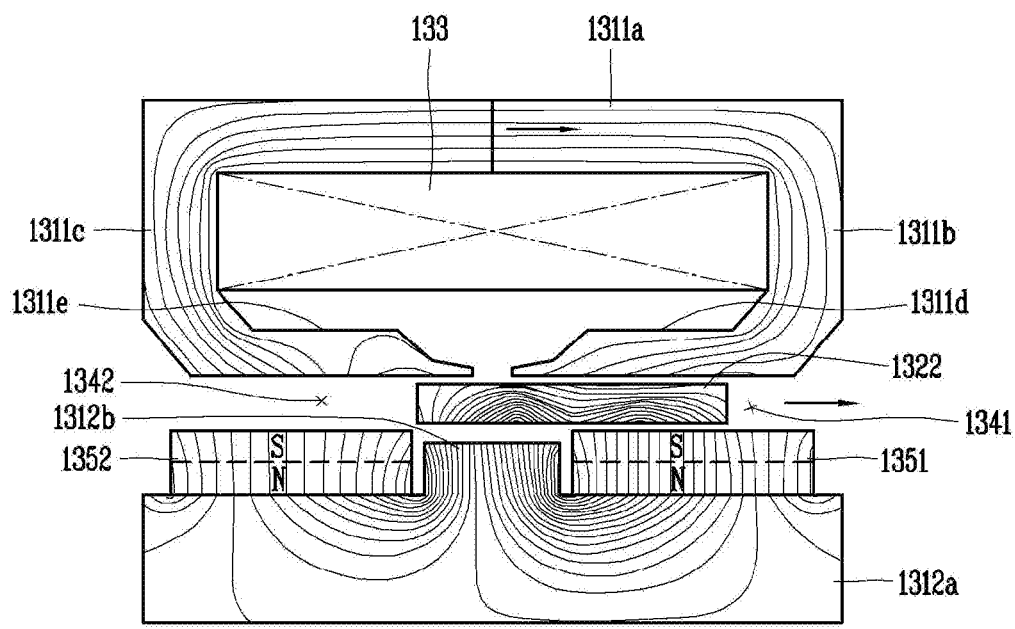
FIGS. 7a and 7b are schematic views illustrating by dividing the operations of a mover according to the direction of the magnetic flux in the stator in the present embodiment.
Figure 7B:
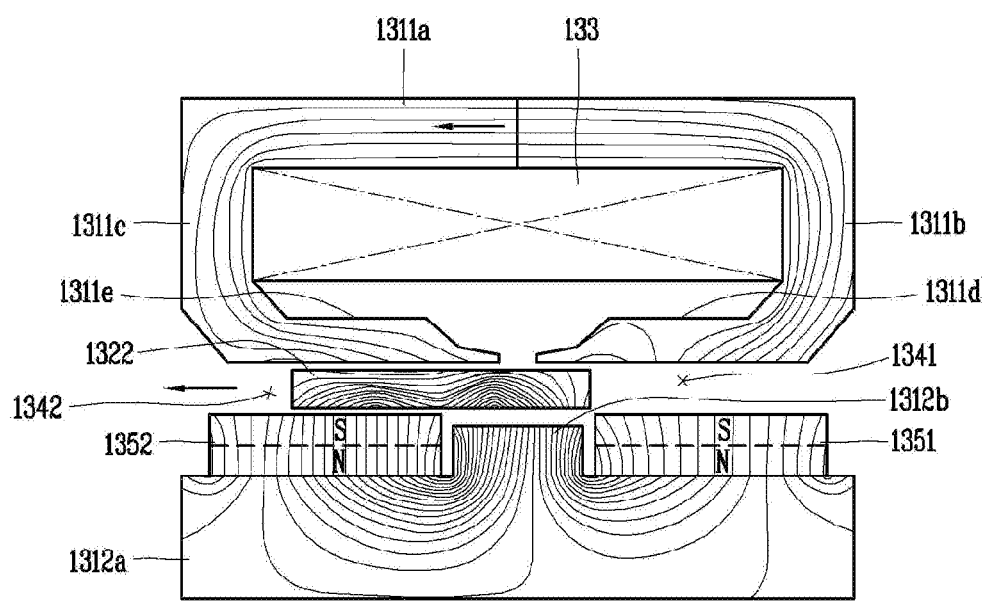

In the linear motor according to the present embodiment as described above, the mover reciprocates according to the direction of the magnetic flux formed in the stator. FIGS. 7a and 7b are schematic views illustrating by dividing the operations of a mover according to the direction of the magnetic flux in the stator in the present embodiment.

FIG. 7a illustrates that the magnetic flux is formed in a clockwise direction, in which case the mover 1322 moves in the direction of the bottom dead center which is the right side of the drawing. At this time, the magnetic flux formed in the outer stator 1311 moves to the central core 1312b through the outer yoke portion 1311a in the axial direction, the first yoke portion 1311b in the radial direction, and the first pole portion 1311d, and among the magnetic flux moving to the central core 1312b, a relatively large magnetic flux is suctioned by the polarity (N pole) of the inner surface of the first magnet 1351. The thrust for mover core 1322 increases while this magnetic flux moves to the outer surface polarity (S pole) of the first magnet 1351, and then forms a closed loop returning to the central core 1312b through the mover core 1322. Accordingly, the mover core 1322 moves from the center of the stator defined as the magnetic path center Cm to the bottom dead center away in the right direction of the drawing.

FIG. 7b illustrates that the magnetic flux is formed in a counterclockwise direction, in which case the mover 1322 moves in the direction of the top dead center, which is the left side of the drawing. At this time, the magnetic flux formed in the outer stator 1311 moves to the central core 1312b through the outer yoke portion 1311a in the axial direction, the second yoke portion 1311c in the radial direction, and the second pole portion 1311e, and among the magnetic flux moving to the central core 1312b, relatively many magnetic fluxes are suctioned to the inner surface polarity (N pole) of the second magnet 1352. The thrust for the mover core 1322 increases while this magnetic flux moves to the outer surface polarity (S pole) of the second magnet 1352 and then forms a closed loop returning to the central core 1312b through the mover core 1322. Accordingly, the mover core 1322 moves from the center of the stator defined as the magnetic path center Cm to the top dead center away in the left direction of the drawing.

Here, as illustrated in FIGS. 7a and 7b, the first magnet 1351 and the second magnet 1352 have magnetic flux formed from the inner circumferential surface to the outer circumferential surface, respectively. Accordingly, The eddy magnetic flux is not formed or is formed very weakly between the first pole portion 1311d of the outer stator 1311 and the first magnet (and one end of the inner stator) 1351 facing the first pole portion 1311d and between the second pole portion 1311e and the second magnet (and the other end of the inner stator) 1352 facing the second pole portion 1311e, respectively. Then, the centering force for the mover core 1322 moved to the bottom dead center or the mover core 1322 moved to the top dead center is weakly generated, so that the mover core 1322 can move smoothly to a bottom dead center or the top dead center as described above. In other words, while the centering force for the mover core 1322 decreases, the thrust increases so that the motor output can be improved compared to the same surface area of the magnet. This, on the contrary, can reduce the amount of magnet used compared to the same motor output, so that when using a ferrite magnet, the motor power of the desired degree can be obtained without increasing the size of the motor. In addition, when the Nd magnet is used, material cost can be reduced by reducing motor usage.

Meanwhile, as described above, the present embodiment can smoothly move the mover core 1322 to the top dead center or the bottom dead center, so that the control characteristics of the mover core 1322 can be improved.

Figure 8:
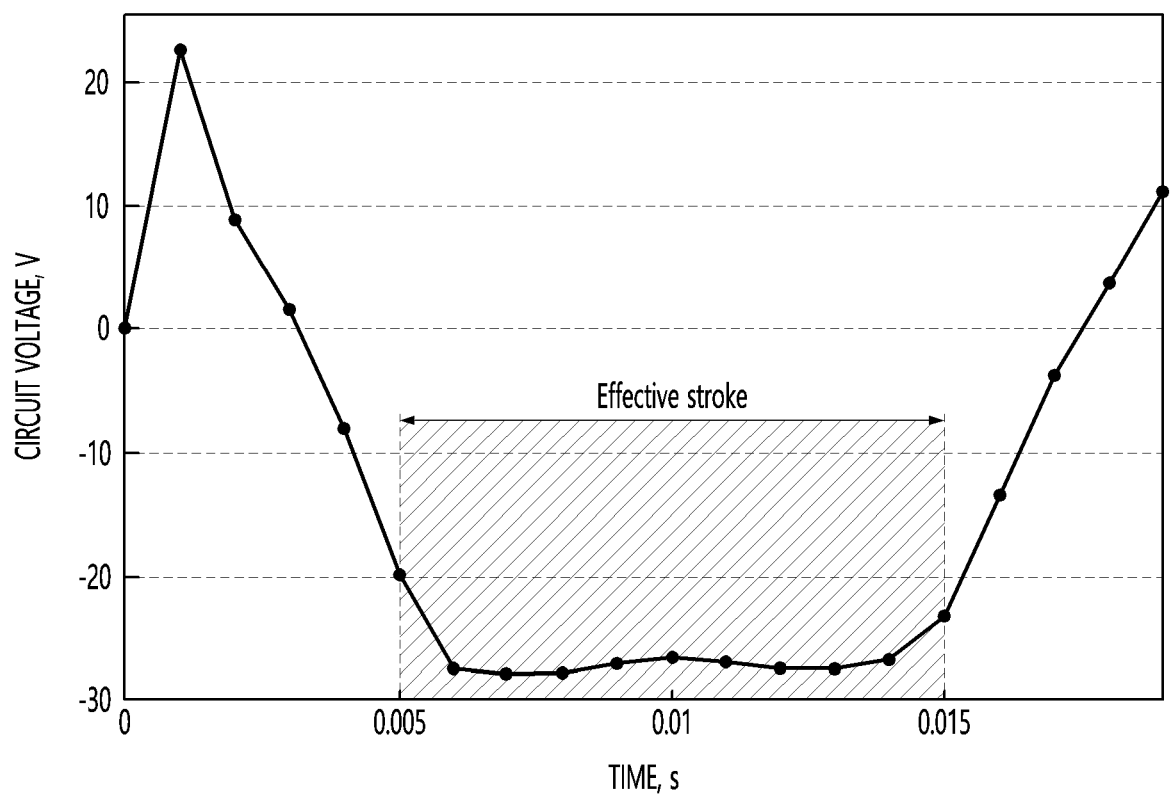
FIG. 8 is a graph measuring the voltage at each position during reciprocation of the core in the linear motor according to the present embodiment.

Normally, when controlling the mover core 1322 based on the bottom dead center, a voltage of an almost similar level is applied for a certain time in the bottom dead center section. This section is defined as a controllable section, that is, an effective stroke section. FIG. 8 is a graph measuring the voltage at each position during reciprocation of the core in the linear motor according to the present embodiment. The effective stroke range of the mover can be found by referring to this.

Referring to FIG. 8, the effective stroke section is a section between approximately 0.005 seconds and 0.015 seconds. It can be seen that the effective stroke range at the bottom dead center is an enlarged result even when compared with Patent Document 1 and Patent Document 2. This is because, as described above, as the first magnet 1351 and the second magnet 1352 are magnetized in the same direction, eddy magnetic flux is not formed or is formed very low.

In addition, in the present embodiment, the first pole portion 1311d and the second pole portion 1311e are provided on both sides around the winding coil, and the first magnet 1351 and the second magnet 1352 are disposed by being spaced apart from each other by the central core 1312b. Accordingly, the alpha waveform of the motor is formed to be symmetrical to the magnetic path center, so that the effective stroke section becomes long. Then, the mover core 1322 can be more accurately controlled, and the motor performance can be improved. At this time, the effective stroke range may be different depending on design variables such as the height (thickness) of the central core 1312b and the length of the mover core 1322.

Figure 9:
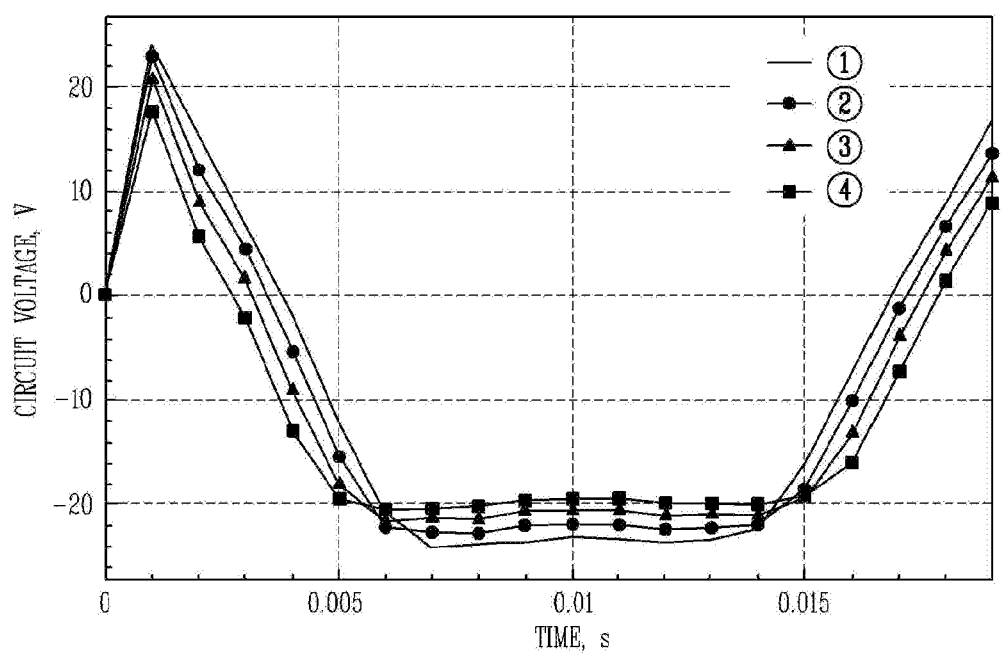
FIG. 9 is a graph illustrating the change of the effective stroke according to the length of the mover core in the linear motor according to the present embodiment.

For example, when the length of the mover core 1322 is shortened, the effective stroke range decreases, and when the length of the mover core 1322 increases, the effective stroke range increases. FIG. 9 is a graph illustrating the change of the effective stroke according to the length of the mover core in the linear motor according to the present embodiment.

The conditions in this experiment set the height of the central core 1312b for each model to be the same and set the length of the mover core 1322 differently. In other words, in the model ①, the length of the mover core 1322 is the shortest, and the length of the mover core 1322 is increased in the order of model ②, model ③, and model ④. The length of the mover core 1322 of model ④ is the longest.

Referring to FIG. 9, the voltage in the bottom dead center section is highest in model ① and lowest in model ④. In addition, it can be seen that the effective stroke section is the narrowest in model ① and the largest in model ④. It can be seen that as the length of the mover core 1322 increases, the overlapping section between the mover core 1322 and the central core 1312b increases, and the effective stroke range increases. Accordingly, it can be seen that, in order to widen the effective stroke range, the length of the mover core 1322 is formed as long as possible, but it is advantageous that at least a portion of the mover core 1322 at the top dead center or the bottom dead center is formed to be overlapped with the central core 1312b in the radial direction.

Figure 10:
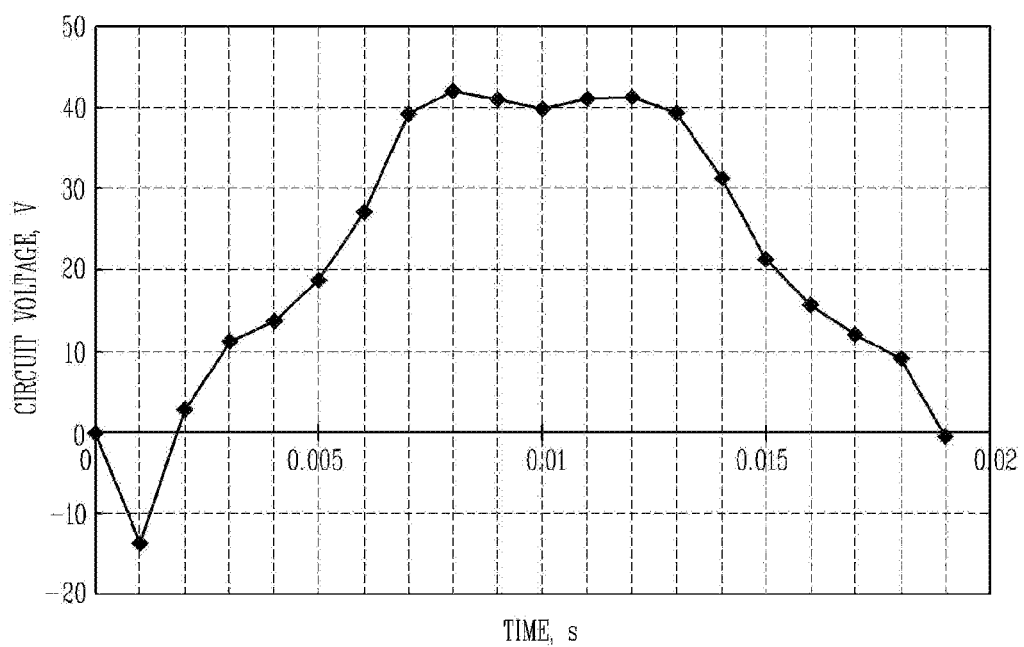
FIG. 10 is a graph illustrating a change in the alpha value (thrust constant) during reciprocation of the mover core in the linear motor according to the present embodiment.

This is also related to the shape of the motor. For example, the linear motor according to the present embodiment forms a two-air gap motor in which the air gaps 1341 and 1342 are formed on both sides around the winding coil 133. Accordingly, the alpha value defined by the thrust constant is symmetrical compared to the one-air gap motor. Then, the shape of the mover core 1322 moving from the bottom dead center to the top dead center and from the top dead center to the bottom dead center forms a similar shape to each other, and thus the efficiency of the motor can be improved while the effective stroke range for the mover core 1322 increases. FIG. 10 is a graph illustrating a change in the alpha value (thrust constant) during reciprocation of the mover core in the linear motor according to the present embodiment. This is a graph illustrating the alpha value when the inner diameter of the magnet is 26 mm, the outer diameter of the magnet is 30 mm, the length of the magnet is 20 mm, and the weight of the movable core is 141 g. Since the X-axis of this graph illustrates the time for the reciprocating motion of the mover core, the X-axis of this graph eventually illustrates the position of the mover core and since the Y-axis thereof illustrates the voltage at that position, the Y-axis thereof eventually illustrates the alpha value at that position.

As illustrated in the drawing, the alpha value of the two-air gap linear motor according to the present embodiment shows a peak value of 42.15 at 0.008 point where the mover core is slightly shifted from the magnetic path center (0.01 point) to the bottom dead center and shows 42.01 which is similar to the peak value at the point of 0.012 which is slightly shifted from the magnetic path center to the top dead center.

Through the graph illustrated in FIG. 10, it can be seen that an operation that the mover core 1322 moves from the bottom dead center to the top dead center and an operation that the mover core 1322 moves from the top dead center to the bottom dead center are approximately symmetrical. Through this, the controllable stroke range for the mover core 1322 is widened, so that motor efficiency can be improved while the control for the mover core 1322 is simplified. Moreover, the efficiency of the linear compressor employing this linear motor can also be improved.

Meanwhile, as illustrated above, the linear motor has been described as an example. Therefore, when the linear motor described prior to the linear compressor is applied, the effect obtained from the linear motor can be also expected in the linear compressor. Therefore, the description of the linear motor is applied to the linear compressor.

Mode for Disclosure

Hereinafter, the linear compressor according to the present embodiment will be described in more detail with reference to the drawings. However, even in different embodiments, the same or similar reference numerals are assigned to the same or similar components as the previous embodiment, and overlapping descriptions thereof may be omitted. In addition, in describing the embodiments disclosed in this specification, when it is determined that detailed descriptions of related known technologies may obscure the gist of the embodiments disclosed herein, detailed descriptions thereof may be omitted.

Figure 11:
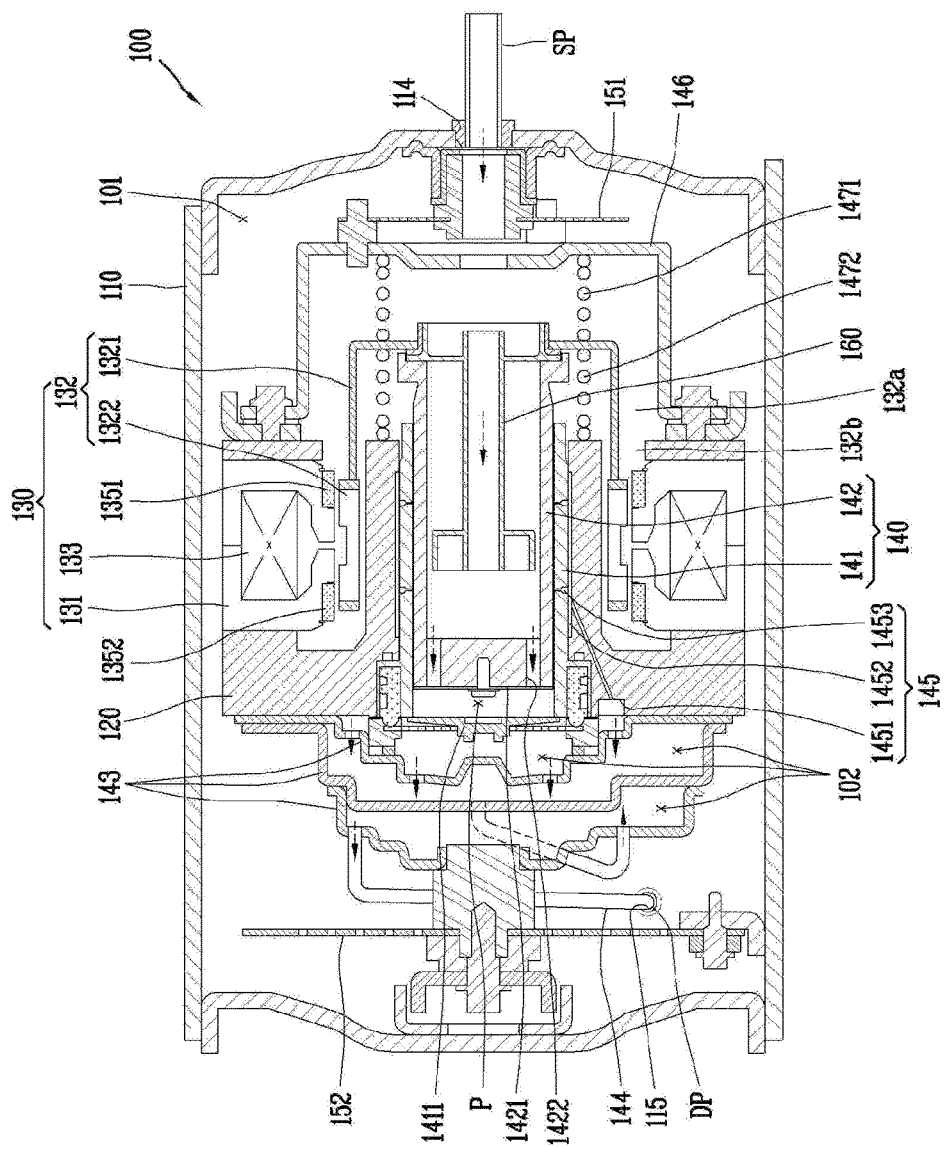
FIG. 11 is a longitudinal sectional view illustrating another embodiment of the linear compressor according to the present disclosure.

FIG. 11 is a longitudinal sectional view illustrating another embodiment of the linear compressor according to the present disclosure. Referring to FIG. 11, the linear compressor 100 of the present embodiment includes a casing 110, a frame 120, a driving unit 130, and a compression unit 140.

The casing 110 may form a sealed space. The sealed space may be the suction space 101 filled with the refrigerant which is suctioned. A suction port 114 may be formed in the casing 110, and a suction pipe SP may be connected to the suction port 114. In addition, a discharge port 115 may be formed in the casing 110, and a discharge pipe DP may be connected to the discharge port 115.

The frame 120 may be provided inside the casing 110 to support the driving unit 130 and the compression unit 140. The frame 120 may be connected to and supported by the other end portion of the support springs 151 and 152, which are positioned so that one end portion thereof is fixed to the casing 110. The support springs 151 and 152 may be made of a plate spring as illustrated or may be made of a coil spring.

The driving unit 130 may serve to generate a reciprocating motion of the linear compressor 100 according to the present embodiment. To this end, the driving unit 130 may include a stator 131 and a mover 132.

The stator 131 may be coupled between the frame 120 and a back cover 146 which will be described later. The mover 132 may be located inside the stator 131.

The stator 131 may be equipped with a winding coil 133 and a magnet, and the mover 132 may include a mover core 1322 made of magnetic material in the connection frame 1321. The mover core 1322 is not a magnet meaning a permanent magnet and may be formed of a ferromagnetic material to form a magnetic circuit together with the stator 131 by the winding coil 133. Accordingly, in the driving unit 130 according to the present embodiment, the magnets 1351 and 1352, which are permanent magnets, are coupled to the stator 131, not the mover 132, and the coupling structure of the magnet will be described later.

The mover 132 may be formed of a connection frame 1321 and a mover core 1322 as described above. The connection frame 1321 may be formed of a non-magnetic metal or a resin material, and the mover core may be formed by sintering a ferromagnetic material or by stacking a sheet of electrical steel.

In addition, the connection frame 1321 may be formed in a cylindrical shape to be coupled to the rear end of the piston. Accordingly, the connection frame 1321 reciprocates together with the piston.

In addition, the mover core may be formed in one ring shape, inserted into the connection frame 1321, or formed in an arc shape to be arranged in the circumferential direction of the connection frame 1321.

Meanwhile, the compression unit 140 suctions the refrigerant in the suction space 101 to compress and discharge the refrigerant. The compression unit 140 may be located at the central portion of the casing 110 toward the inside of the stator 132 and includes a cylinder 141 and a piston 142. The cylinder 141 is supported by the frame 120 and may form a compression chamber P therein.

The cylinder 141 may be formed in a cylindrical shape to receive the refrigerant and the piston 142 therein and may be formed to open both ends. One end of the cylinder 141 may be closed by a discharge valve 1411, and a discharge cover 143 may be mounted outside the discharge valve 1411.

A discharge space 102 may be formed between the discharge valve 1411 and the discharge cover 143. In other words, a space in which the compression chamber P and the discharge cover 143 are separated from each other by the discharge valve 1411 may be formed. In addition, inside the casing 110, a loop pipe 144 extending to communicate with the discharge port 115 and the discharge space 102 may be installed.

Meanwhile, a portion of the refrigerant discharged into the discharge space 102 may flow into the cylinder 141 to form a gas bearing 145 that lubricates between the inner circumferential surface of the cylinder 141 and the outer circumferential surface of the piston 142. The bearing inlet 1451 constituting the inlet of the gas bearing 145 is formed through the frame 120, and the bearing passage 1452 constituting the gas bearing is between the inner circumferential surface of the frame 120 and the outer circumferential surface of the cylinder 142, and the bearing hole 1453 constituting the gas bearing may be formed by penetrating from the outer circumferential surface to the inner circumferential surface of the cylinder.

The piston 142 may be inserted into the opened other end of the cylinder 141 to seal the compression chamber P. The piston 142 may be connected to the mover 132 described above and reciprocated together with the mover 132. A frame 120 and a cylinder 141 may be located between the mover 132 and the piston 142. Accordingly, the mover 132 and the piston 142 may be coupled to each other by separate connection frames 1321 provided to bypass the cylinder 141 and the frame 120. The mover core 1322 described prior to the connection frame 1321 may be inserted into and coupled to the inside or attached to the outer surface to be coupled.

The internal space of the piston 142 and the compression chamber P may be communicated by the suction port 1421. In other words, when the refrigerant flowing into the inner space of the piston 142 from the suction space 101 flows through the suction port 1421, and when the suction valve 1421 opening and closing the suction port 1421 is opened by the pressure of the refrigerant, the refrigerant may be suctioned into the compression chamber P.

Meanwhile, the piston may perform a resonant motion in the axial direction (the reciprocating direction) by thrust and centering force formed by the electromagnetic force of the linear motor, which is the driving unit 120, but the piston may perform resonant motion in the axial direction by the mechanical resonant spring 1471 and 1472 as in the present embodiment. Mechanical resonant springs (hereinafter abbreviated as resonant springs) 1471 and 1472 are made of a compressed coil spring and may be provided on both sides of the connection frame 1321 in the axial direction. In this case, the first resonant spring 1471 may be provided between the connection frame 1321 and the back cover 146, and the second resonant spring 1472 is provided between the connection frame 1321 and the frame 120. However, in some cases, the resonant spring may be provided on only one side based on the connection frame 1321.

The linear compressor according to the present embodiment as described above is operated as follows.

In other words, when current is applied to the winding coil 133 constituting the driving unit 130 in the clockwise or counterclockwise direction, alternating magnetic flux is formed in the stator 131 so that the mover 132 reciprocates linearly. Then, the piston 142 connected to the mover 132 increases and decreases the volume of the compression chamber P while reciprocating inside the cylinder 141.

For example, when the piston 142 is moved while increasing the volume of the compression chamber P, a suction stroke is performed in the compression chamber P. At this time, the internal pressure of the compression chamber P is reduced so that the suction valve 141b provided in the piston 142 is opened, and the refrigerant that has been in the suction space 101 is suctioned into the compression chamber P.

On the other hand, when the piston 142 is moved while reducing the volume of the compression chamber P, a compression stroke is performed in the compression chamber P. At this time, when the internal pressure of the compression chamber P rises and reaches a predetermined pressure, the discharge valve 1411 mounted on the cylinder 141 is opened to discharge the refrigerant into the discharge space 102.

As the suction stroke and the compression stroke of the piston 142 are repeated, the refrigerant is repeated a series of processes in which the refrigerant flows into the suction space 101 through the suction pipe SP, and the refrigerant is suctioned into the compression chamber P and compressed, and the refrigerant is discharged to the outside of the compressor through a discharge space 102, a loop pipe 144, and the discharge pipe.

Meanwhile, in the linear motor and the linear compressor having the same according to the present embodiment, the lighter the weight of the mover is, the more advantageous for the mover including the piston to reciprocate at a high speed. However, if the mover is provided with a magnet which is a permanent magnet, the weight of the mover increases, and thus there is a limit to move the mover at high speed. Moreover, when a ferrite magnet having a low magnetic flux is used, the amount of the magnet used is increased to secure the magnetic flux, and thus the weight of the mover further increases, which may decrease the efficiency of the linear motor and the linear compressor.

However, as described above, if an Nd magnet having a relatively high magnetic flux is used, it is possible to reduce the mover's weight by lowering the amount of the magnet used, but the manufacturing costs of the linear motor and the linear compressor may significantly increase compared to the effect of the mover's weight reduction due to the high price of 10 times or more compared to the price of the ferrite magnet. Therefore, in the present embodiment, a relatively inexpensive magnet such as a ferrite magnet is used, but the magnet can be coupled to the stator to lower the weight of the mover. Accordingly, in the present embodiment, the magnetic flux can be secured by increasing the surface area of the magnet while lowering the material cost for the magnet.

Meanwhile, the linear motor and the linear compressor having the same according to the present embodiment may be applied with a mechanical resonant spring made of a compressed coil spring to induce resonant motion of the mover (or piston). However, the linear motor applied to the linear compressor of the present embodiment has a magnetic resonant spring effect of a certain degree between the stator and the mover due to the characteristics of the linear motor. Therefore, the linear compressor has a mechanical resonant spring made of a compressed coil spring, so that even when strong thrust is generated, the centering force due to the magnetic resonant spring occurs together with the strong thrust. Since this centering force acts as a factor to reduce thrust, lowering the centering force may be effective to increase thrust. This may also be effective in terms of controlling to optimize the reciprocating motion of the linear motor.

In other words, as described above, when a current is applied to the winding coil of the drive unit, a magnetic flux is formed in the stator, and forces that allow the mover to reciprocate may be generated by the interaction between the magnetic flux formed by the application of the current and the magnetic flux formed by the magnet. In other words, in the stator, thrust pushing the mover to the top dead center and bottom dead center and a centering force pulling the retracted mover in the center direction of the magnetic path are generated. The thrust and the centering force are mutually opposite forces, when the centering force increases, the thrust may decrease, and when the centering force decreases, the thrust may increase. In particular, when viewed from the side surface of the linear motor and the linear compressor equipped with a mechanical resonant spring, even if the centering force is set too high, the thrust of the mover moving to the top dead center and the bottom dead center is lowered, and thus the output of the motor may be lowered as a whole.

Accordingly, in the present embodiment, the output of the motor increases by increasing the output of the motor by applying a mechanical resonant spring and, at the same time, by increasing the thrust of the motor against the mover by relocating the magnet. Here, the magnet is not necessarily limited to the ferrite series, and the magnet is not limited to not being used at all in the mover.

Figure 12:
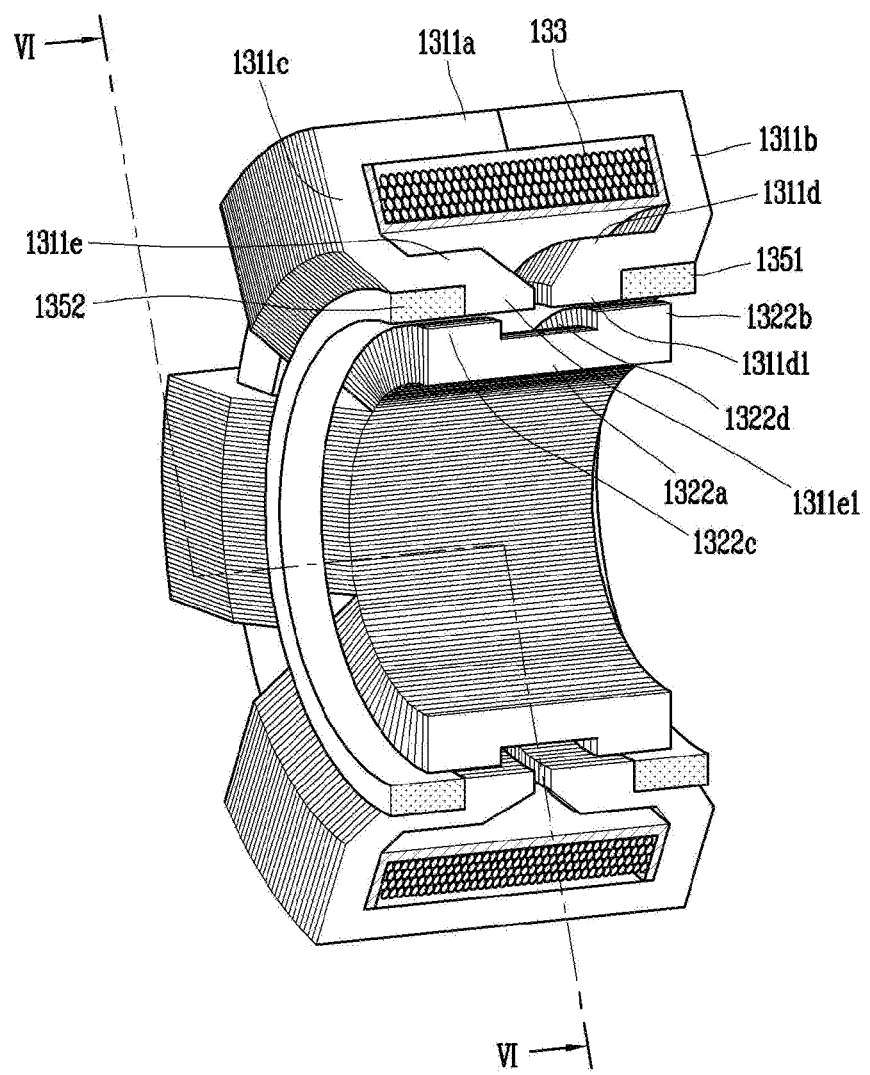
FIG. 12 is a perspective view illustrating a broken linear motor according to the present embodiment.
Figure 13:
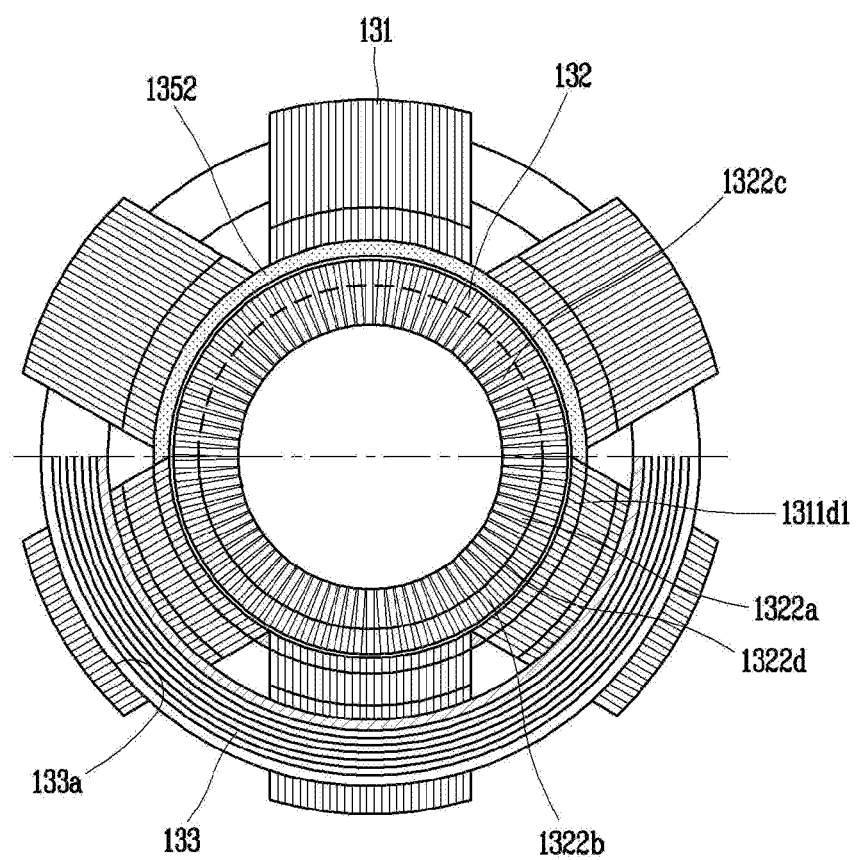
FIG. 13 is a cross-sectional view taken along line "VI-VI" in FIG. 12.
Figure 14:
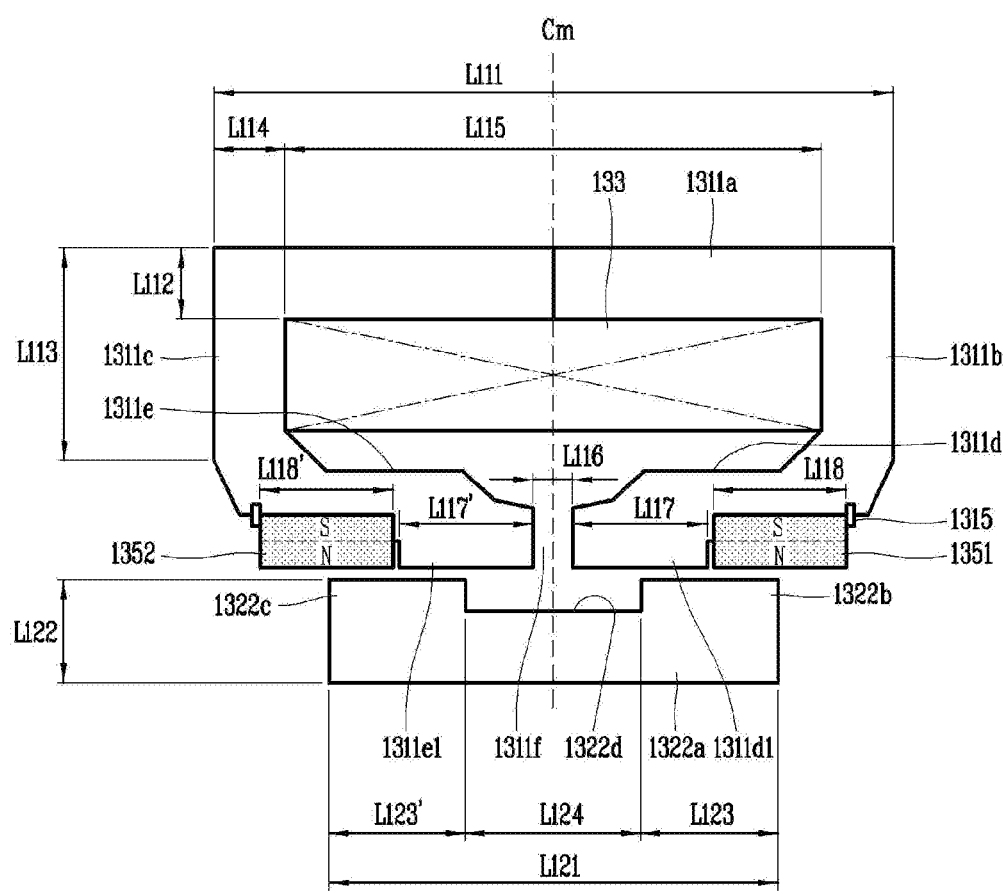
FIG. 14 is a schematic view seen from a side surface in a linear motor according to the present embodiment.

FIG. 12 is a perspective view illustrating a broken linear motor according to the present embodiment, FIG. 13 is a cross-sectional view taken along line "VI-VI" in FIG. 12, and FIG. 14 is a schematic view seen from a side surface in a linear motor according to the present embodiment.

Referring back to FIG. 11, in the stator 131 according to the present embodiment, the side surface of the mover 132 in the axial direction is coupled to the frame 120, and the mover 132 may be disposed to reciprocate between the inner circumferential surface of the stator 131 and the outer circumferential surface of the frame 120. Here, the axial direction is the direction in which the mover reciprocates.

Referring to FIGS. 12 and 13, the stator 131 and the mover 132 may be disposed at both ends of the axial direction apart from each other. Accordingly, air gaps 1341 and 1342 that are spaces in which the mover 132 reciprocates, are formed at both ends of the stator 131 in the axial direction. The air gaps 1341 and 1342 are formed on both sides in the axial direction with the winding coils 133, which will be described later, interposed between the air gaps 1341 and 1342. Here, the axial direction is the direction in which the mover reciprocates.

Referring to FIG. 14, as described above, the stator 131 may be formed in a cylindrical shape by radially stacking a sheet of the stator sheet (no numerical reference), and as in FIGS. 12 and 13, the stator 131 may form in a cylindrical shape by radially stacking a plurality of stator blocks (no numerical reference) made by stacking a sheet of the stator sheet in the thickness direction.

The stator 131 may be formed in a '⊓' shape with the winding coil 133 seated in the middle in the axial direction. Accordingly, the stator 131 may have winding coil grooves 133a formed on the middle thereof, and the air gaps 1341 and 1342 described above may be respectively formed on both sides of the winding coil grooves 133a.

In addition, the stator 131 may include an outer yoke portion 1311a in the axial direction forming the outer circumferential surface of the winding coil groove 131, and a plurality of yoke portions in the radial direction (hereinafter, the first yoke portion in the radial direction and the second yoke portion in the radial direction) 1311b and 1311c which are connected to both ends of the outer yoke portion 1311a in the axial direction and which are made both side surfaces of the winding coil groove 133a in the axial direction.

The outer yoke portion 1311a in the axial direction is formed to be long in the axial direction (the moving direction or the reciprocating direction of the mover) so that the length L111 in the axial direction of the outer yoke portion 1311a in the axial direction is formed longer than the length L112 in the radial direction (the orthogonal direction to the moving direction of the mover). The first yoke portion 1311b in the radial direction and the second yoke portion 1311c in the radial direction may be formed to be long in the radial direction such that the length L113 in the radial direction may be formed longer than the length L114 in the axial direction.

In addition, the length L111 in the radial direction of the outer yoke portion 1311a in the axial direction is formed substantially the same as the length L113 in the axial direction of the first yoke portion 1311b in the radial direction or the second yoke portion 1311c in the radial direction, and the length L113 in the axial direction of the first yoke portion 1311b in the radial direction or the second yoke portion 1311c in the radial direction may be formed smaller than the length L115 in the axial direction of the winding coil groove 133a. The first yoke portion 1311b in the radial direction and the second yoke portion 1311c in the radial direction may be formed to be symmetrical based on the coil winding groove 133a.

Meanwhile, a first pole portion 1311d and a second pole portion 1311e forming polarities may be formed to extend at the inner circumferential side end portions of the first yoke portion 1311b in the radial direction and the second yoke portion 1311c in the radial direction, respectively. In other words, the first pole portion 1311d may be formed to extend in the first yoke portion 1311b in the radial direction and the second pole portion 1311e may be formed to extend in the second yoke portion 1311c in the radial direction.

The first pole portion 1311d is formed to extend from the inner circumferential side end portion of the first yoke portion 1311b in the radial direction toward the magnetic path center Cm in the axial direction, and the second pole portion 1311e may be formed to extend from the inner circumferential side end portion of the second yoke portion 1311c in the radial direction toward the magnetic path center Cm in the axial direction. Accordingly, the first pole portion 1311d and the second pole portion 1311e are formed to extend in a direction toward each other to be close to each other, and a space between the first pole portion 1311d and the second pole portion 1311e is formed to be spaced apart to form a stator air gap 1311f.

The center of the stator air gap 1311f may be formed on the center of the stator 131 in the axial direction, that is, at the magnetic path center Cm to face the center of a recessed portion 1322d of the mover core 1322 which will be described later in the radial direction when the motor (or compressor) is stopped. In addition, the length L116 of the stator air gap 1311f in the axial direction may be shorter than the length L124 of the recessed portion 1322d in the axial direction.

The first pole portion 1311d is formed with a first fixed-side core protrusion 1311d1 extending in a direction from the first pole portion 1311d toward the mover 132, and a first magnet, which will be described later, may be coupled to one side of the first fixed-side core protrusion 1311d1 in the axial direction.

The length of the first fixed-side core protrusion 1311d1 in the axial direction may be formed to be greater than or equal to the axial direction of the first magnet. Accordingly, it is possible to increase the thrust while reducing the amount of the magnet used and reducing the centering force. However, in some cases, the length of the first fixed-side core protrusion 1311d1 in the axial direction may be formed smaller than the axial direction of the first magnet.

In addition, the first fixed-side core protrusion 1311d1 is formed eccentrically toward the stator center Cm among both ends of the first pole portion 1311d, and the first magnet 1351 may be coupled to be supported on an outer side surface of the first stator core 1311d1.

In addition, the length summing the length L117 of the first fixed-side core protrusion 1311d1 in the axial direction and the length L118 of the first magnet 1351 in the axial direction may be formed to be equal to the length summing the length L117' of the second fixed-side core protrusion 1311e1 in the axial direction and the length L118' of the second magnet in the axial direction. In this case, the length L118 of the first magnet 1351 in the axial direction and the length L118' of the second magnet 1352 in the axial direction may be formed to be equal to each other.

Here, since the basic structure of the second pole portion 1311e is formed to be substantially symmetrical to the first pole portion 1311d based on the stator center Cm, the description to the second pole portion 1311e replaces with the description to the first pole portion 1311d.

Meanwhile, the first magnet 1351 and the second magnet 1352 may be formed in an annular shape or may be formed in an arc shape. When the magnet is formed in an annular shape, the magnet can be coupled by inserting into the inner circumferential surface of the stator 131, and when the magnet is formed in an arc shape, the magnet can be coupled by attaching to the inner circumferential surface of the stator 131. Accordingly, as the magnets 1351 and 1352 are inserted into and coupled to the inner circumferential surface of the stator 131, the assembly operation of the magnet may be easily performed. Furthermore, as the first magnet 1351 and the second magnet 1352 are magnetized in the same direction, the magnetization operation for the magnet can be easily performed. Furthermore, as the first pole portion 1311d and the second pole portion 1311e serve as a kind of magnet, it is possible to reduce the length of the magnets 1351 and 1352 in the axial direction relative to the output. Accordingly, it is possible to further reduce the material cost by reducing the amount of magnet used. In addition, it is possible to increase the efficiency of the motor by reducing the length of the mover.

Figure 15:
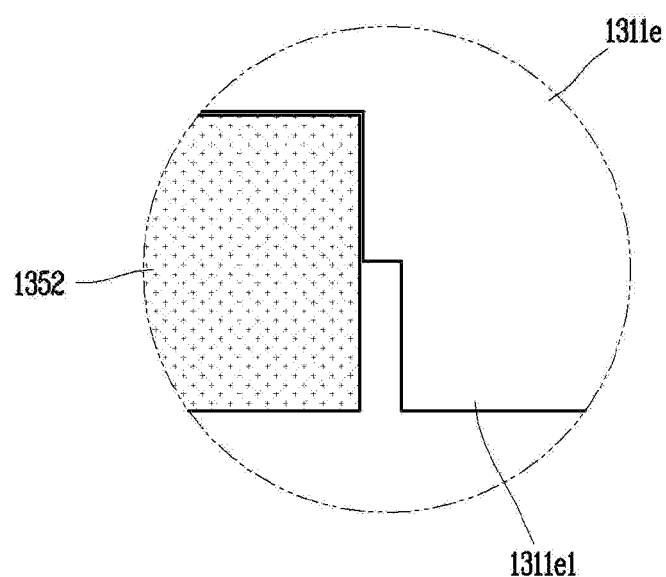
FIG. 15 is an enlarged view illustrating a coupling relationship between the magnet and the central core in the linear motor according to the present embodiment.

In addition, the first magnet 1351 and the second magnet 1352 may be supported so as not to deviate in the axial direction after being coupled to the stator 131. For example, as illustrated in FIG. 12, the direction toward each of the fixed-side core protrusions 1311d1 and 1311e1 in the axial direction can be supported in close contact with both side surfaces of the fixed-side core protrusions 1311d1 and 1311e1. However, as illustrated in FIG. 15, the support surface portions 1311d11 and 1311e11 are formed to be stepped on both side surfaces of the fixed-side core protrusions 1311d1 and 1311e1, so that the side surface of each of the magnets may be fixed by being in close contact with the support surface portion 1311d11. In this case, a portion of the first magnet 1351 and the second magnet 1352 may be spaced apart from both side surfaces of the fixed-side core protrusions 1311d1 and 1311e1.

In addition, opposite side surfaces of the first magnet 1351 and the second magnet 1352 may be axially supported by respective fixing members 1315 coupled to the stator 131. The fixing member is formed in a C-ring shape, annular fixing grooves 1315a are formed on both inner circumferential surfaces of the stator 131, respectively, and each fixing member 1315 is coupled to be inserted into each fixing groove 1315a.

Referring to FIG. 14 again, the first magnet 1351 and the second magnet 1352 may be magnetized in the same direction. Accordingly, the first magnet 1351 and the second magnet 1352 have the same polarity with each other in the radial direction. For example, the inner circumferential surface of the first magnet 1351 and the inner circumferential surface of the second magnet 1352 are magnetized into N poles and the outer circumferential surface of the first magnet 1351 and the outer circumferential surface of the second magnet 1352 are magnetized into S poles so that the first magnet 1351 and the second magnet 1352 can form the magnetic force lines from the inner circumferential surface to the outer circumferential surface of the first magnet 1351 and the second magnet 1352. Accordingly, by removing or minimizing the centering force for the mover core 1322 around the first magnet 1351 and the second magnet 1352, it is possible to generate thrust only for the mover core 1322 or maximize the thrust. This will be described later.

In addition, the first magnet 1351 and the second magnet 1352 may be formed to have the same lengths L118 and L118' in the axial direction. Accordingly, the mover core 1322 reciprocates by the same distance from the magnetic path center Cm.

However, in some cases, the length L118 of the first magnet 1351 in the axial direction and the length L118' in the axial direction of the second magnet 1352 may be formed differently. For example, when the linear motor is applied to a linear compressor having one compression chamber, the length L118' of the second magnet 1352 in the axial direction close to the compression chamber P may be formed longer than the length L118 of the first magnet 1351 in the axial direction, in consideration of the piston 142 being pushed by the pressure of the compression chamber P. Alternatively, the second magnet 1352 may be disposed closer to the compression chamber based on the magnetic path center Cm. Accordingly, the piston connected to the mover core can generate a larger thrust toward the compression chamber.

Meanwhile, the mover core 1322 may include an inner yoke portion 1322a in the axial direction forming a magnetic path together with a stator 131, and a first movable-side core protrusion 1322b and a second movable-side core protrusion 1322c which extend from both ends of the inner yoke portion 1322a in the axial direction toward the stator 131 with distance interposed therebetween, respectively. Accordingly, a recessed portion 1322d recessed by a predetermined depth is formed between the first movable-side core protrusion 1322b and the second movable-side core protrusion 1322c.

Here, the mover core 1322, as described above, is not a magnet meaning a permanent magnet, and is sufficient as long as it is magnetic material capable of forming a magnetic circuit together with the stator 131 by a winding coil 133 such as an electrical steel.

The inner yoke portion 1322a in the axial direction is formed to be long in the axial direction. Accordingly, the length L121 in the axial direction of the inner yoke portion 1322a in the axial direction is formed smaller than the length L111 in the axial direction of the outer yoke portion in the axial direction 1311 of the stator 131. For example, the length L121 in the axial direction of the inner yoke portion 1322a in the axial direction may be formed larger than the length L117 between each contact of a plurality of magnets 1351 and 1352 and the fixed-side core protrusions 1311*d*1 facing the plurality of magnets 1351 and 1352.

In addition, the length (thickness) L122 in the radial direction of the inner yoke portion 1322a in the axial direction is formed substantially the same as the length L112 in the radial direction of the outer yoke portion in the axial direction 1311 of the stator 131. Here, the length L121 in the axial direction of the inner yoke portion 1322a in the axial direction is defined as the overall length of the mover core 1322 in the axial direction.

In addition, the length L123 in the axial direction of the first movable-side core protrusion 1322b is the same or larger than the first fixed-side core protrusion 1311*d*1 and the length L117 in the axial direction, and the length L123' of the second movable-side core protrusion 1322c in the axial direction may be formed equal to or larger than a length L117' of the second fixed-side core protrusion 1311*e*1 in the axial direction. For example, in a state where the inner linear motor is stopped, the centers of both movable-side core protrusions 1322a and 1322b may be formed to be positioned substantially on a straight line in the radial direction with each contact point. Then, when the motor starts, the movable-side core protrusions can quickly reciprocate.

In this way, the mover core 1322 reciprocates according to the direction of the magnetic flux formed in the stator. However, the starting point and ending point of the effective stroke are changed according to the length of the mover core 1322, and thus the alpha value is also changed. For example, the shorter the length of the mover core, the narrower the effective stroke range, while the longer the length of the mover core, the wider the effective stroke range.

Figure 16A:
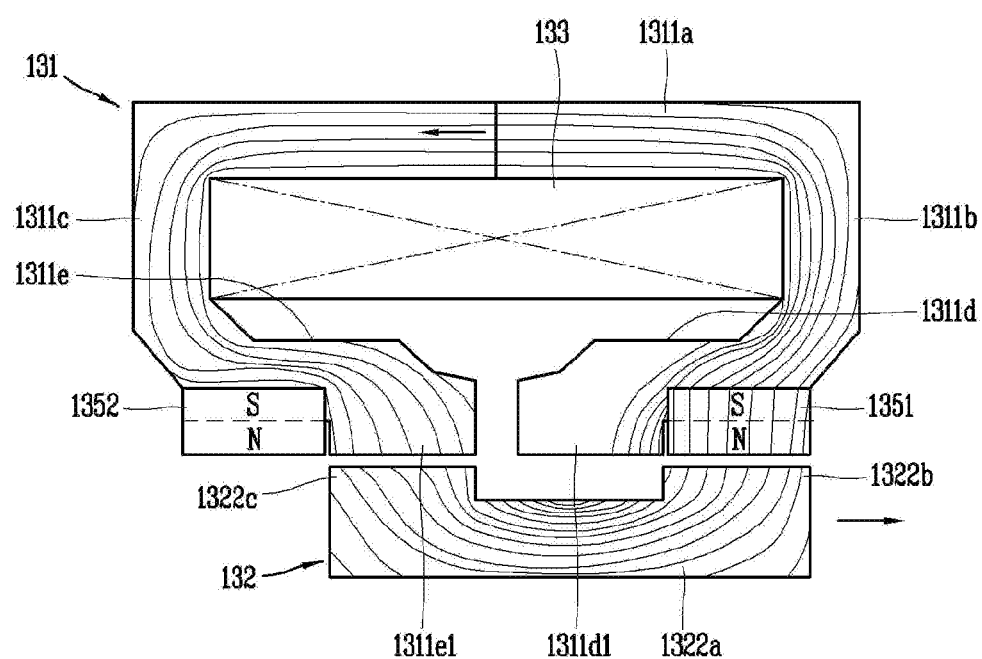
FIGS. 16a and 16b are schematic views illustrating by dividing the operations of the mover according to the direction of the magnetic flux in the stator in the present embodiment.
Figure 16B:
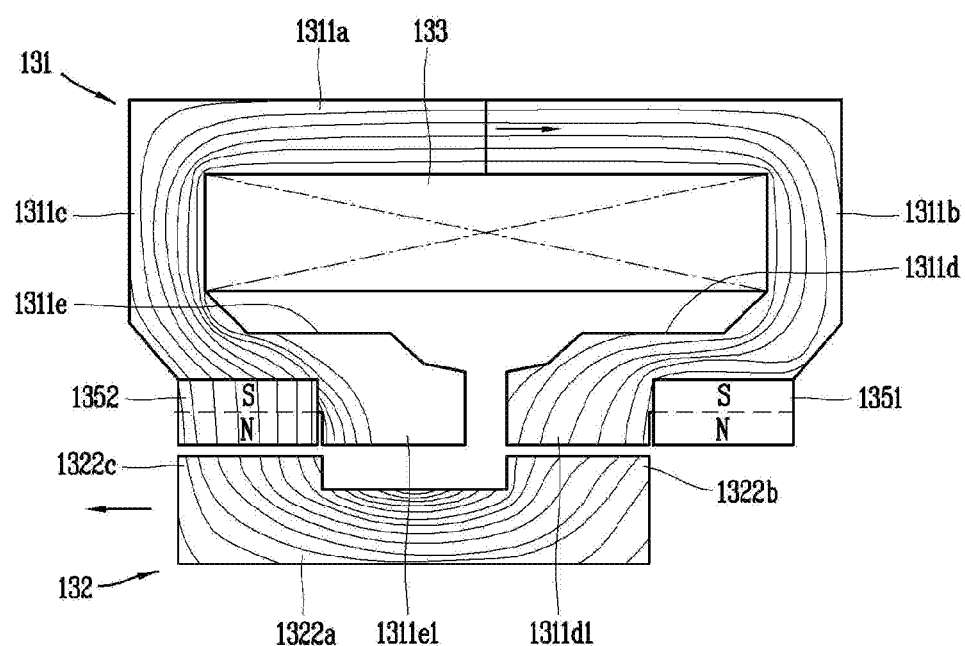

In the linear motor according to the present embodiment as described above, the mover reciprocates according to the direction of the magnetic flux formed in the stator. FIGS. 16a and 16b are schematic views illustrating by dividing the operations of the mover according to the direction of the magnetic flux in the stator in the present embodiment.

FIG. 16a illustrates that the magnetic flux is formed in a counterclockwise direction, in which case the mover core 1322 moves in the direction of the bottom dead center on the right side of the drawing. At this time, the magnetic flux formed in the stator 131 is moved to the second movable-side core protrusion 1322c through the outer yoke portion 1311a in the axial direction, the first yoke portion 1311c in the radial direction, and the second pole part 1311e, and the magnetic flux moving to the second movable-side core protrusion 1322c moves to the first movable-side core protrusion 1322b through the inner yoke portion 1322a in the axial direction, and the thrust for the mover core 1322 increases while forming a closed loop moving to the first pole portion 1311d through the first magnet 1351 from the first movable-side core protrusion 1322b. Accordingly, the mover core 1322 moves from the center of the stator defined as the magnetic path center Cm to the bottom dead center away in the right direction of the drawing.

FIG. 16b illustrates that the magnetic flux is formed in the clockwise direction, in which case the mover core 1322 moves in the direction of the top dead center, which is the left side of the drawing. At this time, the magnetic flux formed in the stator 131 is moved to the first movable-side core protrusion 1322b through the outer yoke portion 1311a in the axial direction, the first yoke portion 1311b in the radial direction, and the first pole portion 1311d, the magnetic flux moving to the first movable-side core protrusion 1322b moves to the second movable-side core protrusion 1322c through the inner yoke portion 1322a in the axial direction, and increases the thrust for the mover core 1322 while forming the closed loop moving to the second pole portion 1311e through the second magnet 1352 from the second movable-side core protrusion 1322c. Accordingly, the mover core 1322 moves from the center of the stator defined as the magnetic path center Cm to the top dead center away in the left direction of the drawing.

Here, as illustrated in FIG. 16a and FIG. 16b, the first magnet 1351 and the second magnet 1352 form the magnetic flux from the inner circumferential surface in the outer circumferential surface direction, respectively. In addition, only the first stator core 1311d1 extending from the first pole portion 1311d and the second stator core 1311e1 extending from the second pole portion 1311e are formed on one side of the first magnet 1351 in the axial direction and on side of the second magnet 1352 in the axial direction. Accordingly, the eddy magnetic flux is not formed or weakly formed between the first pole portion 1311d of the stator 131 and the first magnet (and the first movable-side core protrusion) 1351 facing the first pole portion, and between the second pole portion 1311e and the second magnet (and the second movable-side core protrusion) facing the second pole portion 1311e, respectively. Then, the centering force for the mover core 1322 moved to the bottom dead center or the mover core 1322 moved to the top dead center is weakly generated, so that the mover core can move smoothly to the bottom dead center or top dead center as described above. In other words, the centering force for the mover core is reduced while the thrust is increased, so that the motor power can be improved compared to the surface area of the same magnet. On the contrary, it is possible to reduce the amount of magnet used compared to the same motor output, and when using a ferrite magnet, the motor power of the desired degree can be obtained without increasing the size of the motor. In addition, when the Nd magnet is used, material cost can be reduced by reducing motor usage.

Figure 17:
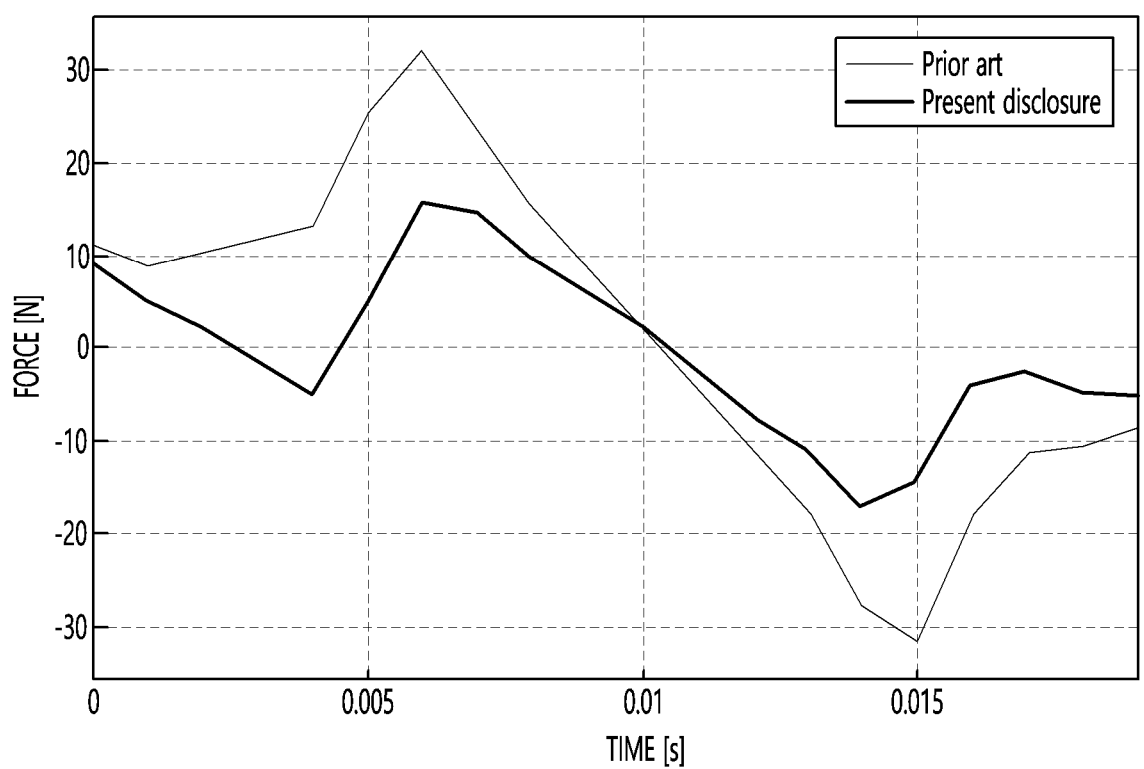
FIG. 17 is a graph illustrating the centering force of the linear motor according to the present embodiment compared to the prior art.

FIG. 17 is a graph illustrating the centering force of the linear motor according to the present embodiment compared to the prior art. The conventional linear motor is a comparison using the above-described one-air gap linear motor as an example.

Referring to FIG. 17, the centering force at the top dead center is about 32 N in the prior art. However, it can be seen that the present embodiment is reduced to about 14 N. In addition, it can be seen that also in the bottom dead center, the centering force is 32 N in the prior art and 14 N in the present embodiment. Accordingly, it can be seen that the centering force is reduced by about 57% in the present embodiment compared to the prior art.

As described above, since the centering force in the linear motor is opposite to the thrust, reducing the centering force by 57% means that the thrust is improved by 57%. Then, in a case of the present embodiment, the thrust is greatly improved compared to the thrust in the prior art, so that the mover core (or mover) 1322 can smoothly move to the top dead center or the bottom dead center, thereby greatly improving motor efficiency. This is because, as described above, as the first magnet 1351 and the second magnet 1352 are magnetized in the same direction, eddy magnetic flux is not formed or is formed very low.

In addition, in the present embodiment, the first pole portion 1311d and the second pole portion 1311e are provided on both sides around the winding coil 133, and the first magnet 1351 and the second magnet 1352 are disposed on the first pole portion 1311d and the second pole portion 1311e in the same direction as each other, and the first stator core 1311d1 and the second stator core 1311e1 are formed on the side surfaces of the first magnet 1351 and the second magnet 1352 in the axial direction, respectively. Accordingly, the alpha waveform of the motor is formed to be symmetrical to the magnetic path center, so that the effective stroke section becomes long. This allows more accurate control of the mover core, which can improve motor performance.

Figure 18:
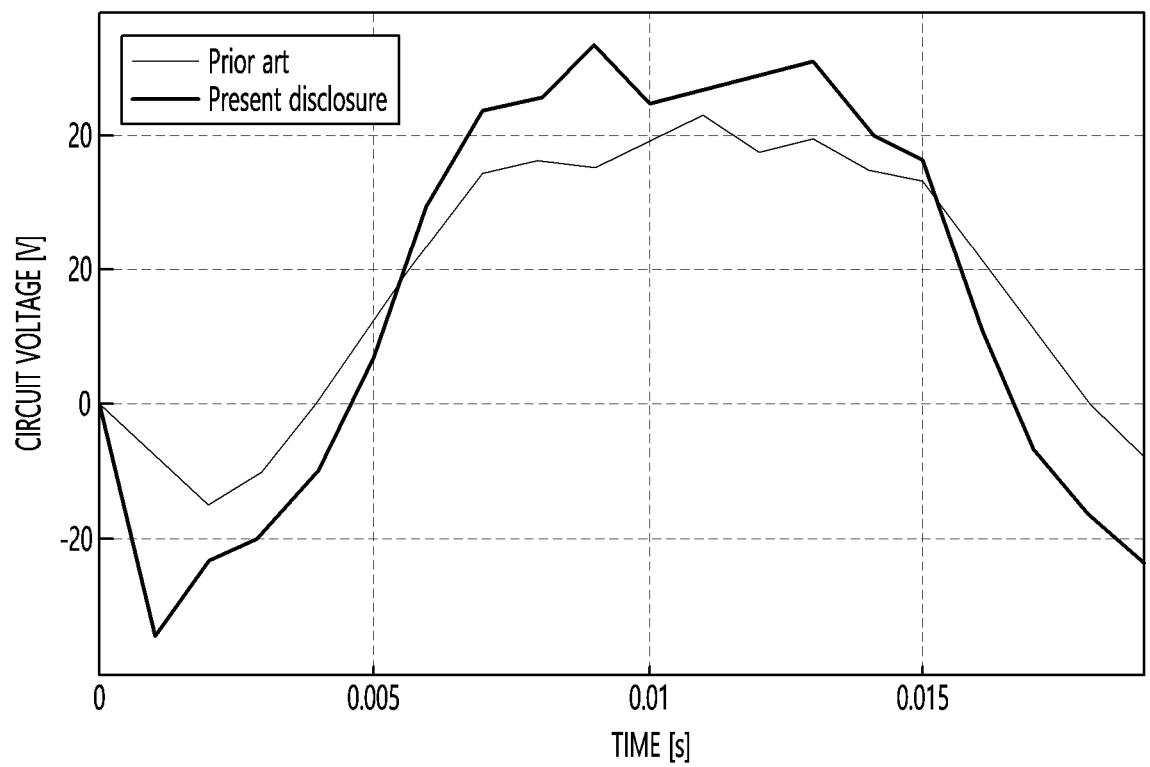
FIG. 18 is a graph illustrating the back electromotive force of the linear motor according to the present embodiment compared to the prior art.

In addition, in the present embodiment, the back electromotive force is increased, so that the motor output can be improved. FIG. 18 is a graph illustrating the back electromotive force of the linear motor according to the present embodiment compared to the prior art. Here, as an example of the linear motor in the prior art, the one-air gap linear motor described above is exemplified.

Referring to FIG. 18, back electromotive force Bemf in the prior art is approximately 36.5. However, the back electromotive force of the present embodiment is about 45.5, and it can be seen that the back electromotive force is improved by about 24% compared to the prior art. Accordingly, the motor output proportional to the back electromotive force can be improved.

Meanwhile, as illustrated above, the linear motor has been described as an example. Therefore, when the linear motor described prior to the linear compressor is applied, the effect obtained from the linear motor can be also expected in the linear compressor. Therefore, the description of the linear motor is applied to the linear compressor.

As described above, a structure in which a plurality of magnets are fixed to a stator of a linear motor, but a plurality of magnets are magnetized in the same direction has been described. Through this, instead of lowering the centering force for the mover core, the thrust is increased, and thus the motor performance can be improved by increasing the motor output or increasing the effective stroke section while using a ferrite magnet. Hereinafter, a structure for further improving the motor efficiency by lowering the core loss in the stator will be described. The stator described below may apply the fixing structure of the magnet described above. However, for convenience of description, the stator structure described above is not limited and is illustrated by simplifying the general stator structure. However, even if the stator described below is applied in the same structure as the above-described stator, the basic structure or effect is the same.

Figure 19:
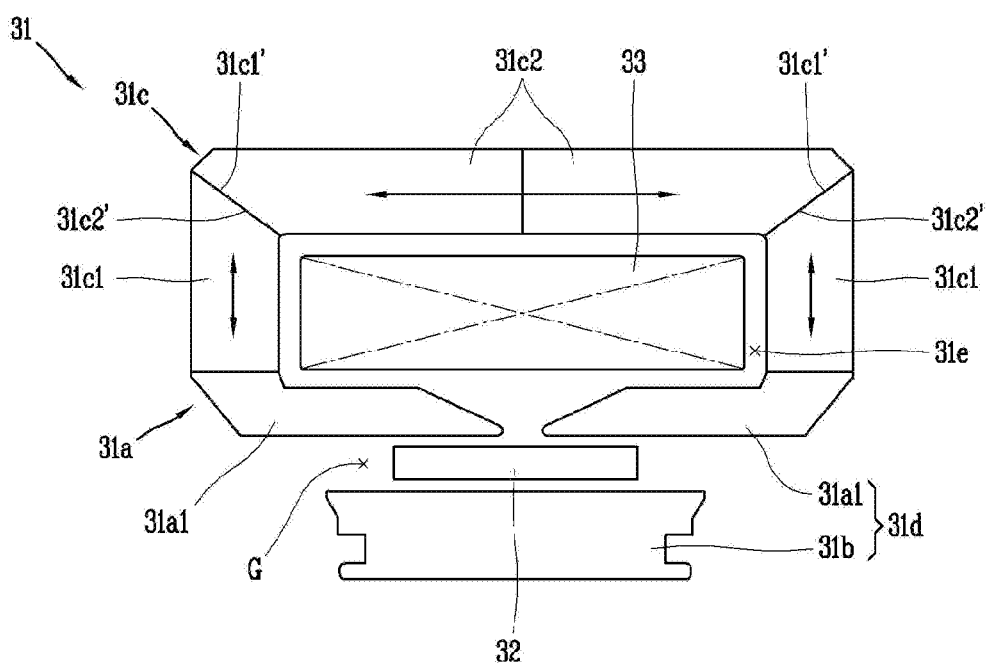
Figure 20A:
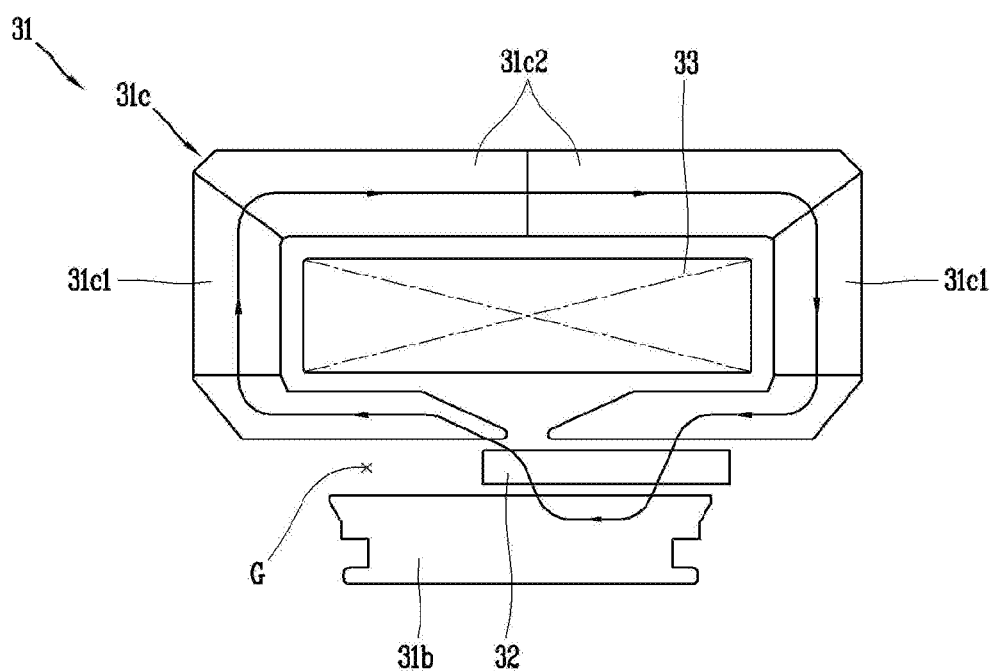
FIGS. 20a and 20b are views illustrating the path of the magnetic flux formed in the stator according to the position of the mover.
Figure 20B:
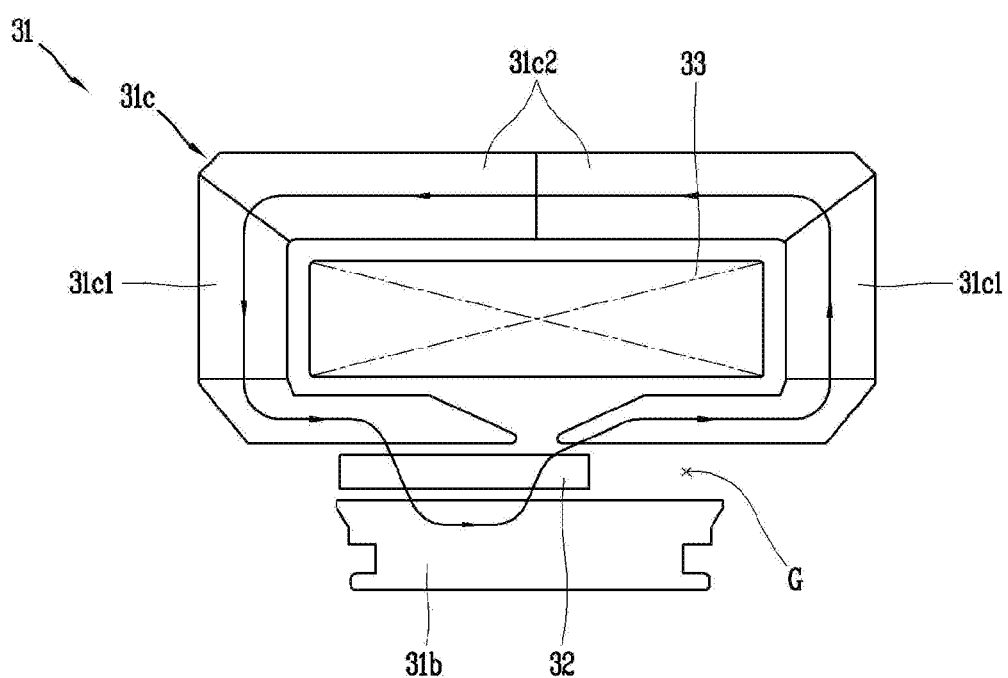
Figure 21:
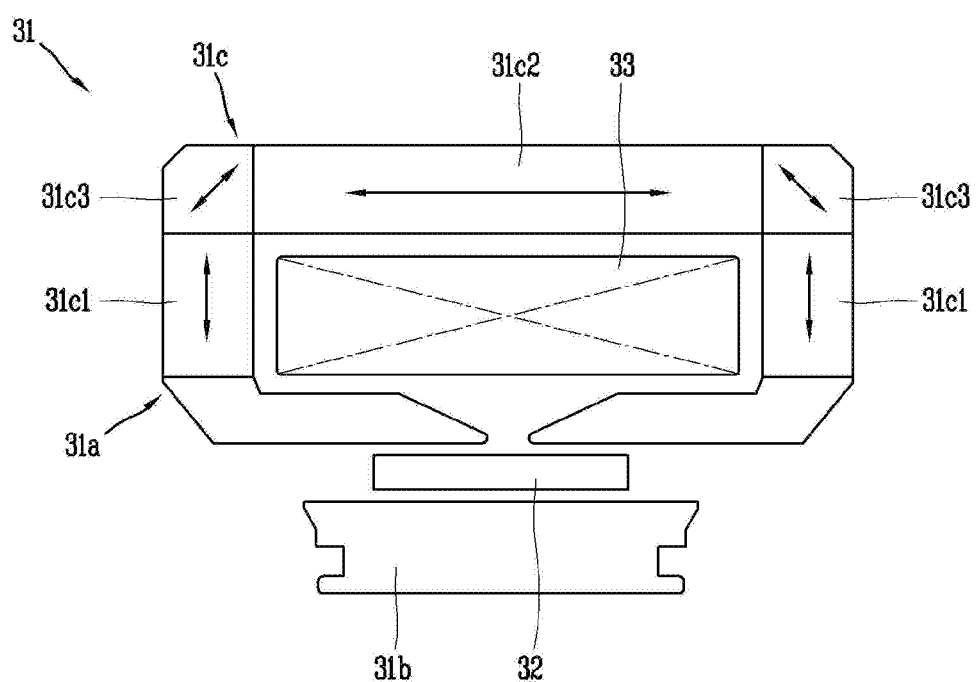

FIGS. 19 to 21 are schematic views illustrating a typical linear motor for explaining a stator sheet forming a stator in a linear motor according to the present disclosure, wherein FIG. 19 is a view illustrating a section of the stator, FIGS. 20a and 20b are views illustrating the path of the magnetic flux formed in the stator according to the position of the mover, and FIG. 21 is a view illustrating a cross-section of another embodiment in the stator according to the present disclosure.

Referring to FIG. 19, in the present embodiment, the stator 31 is disposed on a path of the magnetic flux formed by the winding coil 33, and in particular, in the stator, at least one grain-oriented core portion 31c which is formed so that the easy direction of magnetization is uniformly distributed is provided.

The easy direction of magnetization means a direction that is particularly easy to magnetize when a material is magnetized in a magnetic field. When the same electrical power is input, when the direction of the magnetic flux formed in the stator 31 and the easy direction of magnetization coincide, electromagnetic force may be generated larger than that of the case in which the direction of the magnetic flux formed in the stator 31 and the easy direction of magnetization do not coincide. Therefore, if the easy direction of magnetization and the direction of the magnetic flux coincide with each other, the core loss, which is energy loss in the process of magnetizing the stator 31 by the magnetic field, can be further reduced.

The grain-oriented core portion 31*c* may be formed of grain-oriented electrical steel when the stator 31 is manufactured. Non-oriented electrical steel, which is a material for the stator sheet of a stator in the prior art, has uniform magnetic properties regardless of the direction in which it is rolled or other directions. Alternatively, the grain-oriented electrical steel has a characteristic in that the easy direction of magnetization of crystals is formed parallel to the direction in which the steel sheet is rolled, and has a small advantage in that core loss is small when being magnetized in the rolling direction.

As described above, when the core loss is reduced by a portion of the stator 31 made of the grain-oriented core portion 31*c*, the motor efficiency of converting electrical energy into rotational force can be improved. The overall efficiency of the linear compressor can be improved by improving motor efficiency.

The grain-oriented core portion 31*c* may include a pair of core portions 31*c*1 in the radial direction and a pair of core portions 31*c*2 in the reciprocating direction. The pair of core portions 31*c*1 in the radial direction are disposed to be spaced apart from each other with the winding coil 33 interposed therebetween and are formed to extend in the radial direction of the cylinder 41. In addition, the easy direction of magnetization of the core portion 31*c*1 in the radial direction may be formed parallel to the radial direction of the mover (a vertical direction in FIG. 19). At this time, the space between the pair of core portions 31*c*1 in the radial direction spaced apart from each other may be a coil receiving portion 31*e* in which the winding coil 33 is mounted.

In addition, the core portion 31*c*2 in the reciprocating direction may be formed to connect a pair of core portions 31*c*1 in the radial direction to each other in the reciprocating direction of the mover. In other words, both end portions of the core portion 31*c*2 in the reciprocating direction may be respectively connected to the outer circumferential side end portions of the pair of core portions 31*c*1 in the radial direction. In particular, the easy direction of magnetization of the core portion 31*c*2 in the reciprocating direction may be formed parallel to the reciprocating direction of the mover (left and right directions in FIG. 19). Here, the core portion 31*c*2 in the reciprocating direction may be formed to surround the outer circumferential side of the winding coil 33.

As a result, in the outer stator 31*a* forming the coil receiving portion 31*e*, the easy direction of magnetization can be distributed to extend along both end portions of the mover in the reciprocating direction and the outer circumferential side adjacent to the winding coil 33.

Referring to FIGS. 20*a* and 20*b*, it can be confirmed that the magnetic flux path formed in the outer stator 31*a* changes according to the moving direction of the mover 32. However, among the outer stator 31*a*, in the core portion 31*c*1 in the radial direction and the core portion 31*c*2 in the reciprocating direction, the direction of magnetic flux shows a distribution which alternately changes only in opposite directions.

In other words, unlike that the magnetic flux distribution of the portion which is spaced apart from the inner stator 31*b* to form the air gap G is changed to various angles according to a position of the mover 32, in the core portion 31*c*1 in the radial direction and the core portion 31*c*2 in the reciprocating direction, the direction of the magnetic flux may be changed in opposite directions alternately clockwise and counterclockwise about the winding coil 33.

Here, the air gap forming portion 31*a*1 spaced apart from the inner stator 31*b* to be parallel to each other is a portion in which the direction of the magnetic flux changes at various angles, and may be spaced apart to be parallel to the core portion 31*c*2 in the reciprocating direction with the winding coil 33 interposed therebetween. The air gap forming portion 31*a*1 may be formed of a non-oriented electrical steel which is a material in the prior art. In other words, the air gap forming portion 31*a*1 may be made of a material whose crystals have irregular easy directions of magnetization.

As illustrated in FIGS. 19, 20*a*, and 20*b*, by applying the grain-oriented core portion 31*c* to a portion of the outer stator 31*a*, the core loss generated in the process of repeatedly magnetizing the stator 31 can be effectively reduced. In particular, among the outer stators 31*a*, as the regular easy direction of magnetization is provided by avoiding the air gap forming portion 31*a*1, the effect of reducing the core loss according to the application of the grain-oriented core portion 31*c* can be maximized.

Meanwhile, hereinafter, a structure for a portion in which the core portion 31*c*1 in the radial direction and the core portion 31*c*2 in the reciprocating direction are coupled to each other will be described.

In the present embodiment, the pair of core portions 31*c*1 in the radial direction have a pair of inclined surfaces 31*c*1' which are formed to be inclined in opposite directions to each other to face each other at their outer circumferential ends (upper end portion in FIG. 19). In other words, the pair of inclined surfaces 31*c*1' may be formed to be inclined with the easy direction of magnetization of the core portion 31*c*1 in the radial direction.

Correspondingly, the core portion 31*c*2 in the reciprocating direction may have an inclined coupling surface 31*c*2'. The inclined coupling surfaces 31*c*2' may be formed to be inclined at both end portions of the core portion 31*c*2 in the reciprocating portion so as to be in surface contact with a pair of inclined surfaces 31*c*1' of the core portion 31*c*1 in the radial direction, respectively.

A pair of inclined surfaces 31*c*1' and an inclined coupling surface 31*c*2' coupled thereto are formed, whereby in a portion in which a core portion 31*c*2 in the reciprocating direction and a pair of core portions 31*c*1 in the radial direction are connected, the abrupt changes in the easy direction of magnetization are suppressed and thus core loss can be reduced. Further, in the coupling between a pair of core portions 31*c*1 in the radial direction and a pair of core portions 31*c*2 in the reciprocating direction, the cross-sectional area of the coupling surface can be secured wide, so that the durability of the coupling can be further guaranteed.

Meanwhile, in the embodiment according to FIG. 21, the outer circumferential side end portion of the pair of core portion 231*c*1 in the radial direction may be made of a surface facing the radial direction of the mover in parallel with each other. However, the grain-oriented core portion 231*c* may further include a pair of connecting core portions 231*c*3. The pair of connecting core portions 231*c*3 may be respectively coupled to the outer circumferential side end portions of the pair of core portions 231*c*1 in the radial direction, and the easy direction of magnetization may be formed to be inclined. Specifically, the easy direction of magnetization of the pair of connecting core portions 231c3 may be formed to be inclined in opposite directions to the easy direction of magnetization of the pair of core portions 231c1 in the radial direction.

In addition, a core portion 231c2 in the reciprocating direction may be connected between the pair of connecting core portions 231c3 of the present embodiment. In other words, connecting core portions 231c3 may be coupled to both end portions of the core portion 231c2 in the reciprocating direction.

According to the embodiment of FIG. 21, the easy direction of magnetization in a corner portion surrounding the winding coil 233 in the outer core 231a may be more consistent with the magnetic flux distribution. Accordingly, there is room for the core loss to be further reduced than in the previous embodiment. In one embodiment and another embodiment of the present disclosure, when the bonding structure is added to the outer core 231a, the effect on the strength and the level of reducing core loss can be compared to each other and utilized in the design.

Meanwhile, when the stator 231 according to the present disclosure is formed by stacking an electrical steel, the stator 231 may include a non-oriented core portion 231d made of a non-oriented electrical steel and a grain-oriented core portion 231c made of a grain-oriented electrical steel.

The non-oriented core portion 231d may form an air gap forming portion 231a1 of the inner stator 231a and an inner stator 231b as described above. The air gap forming portion 231a1 and the inner stator 231b may be spaced apart from each other in parallel to form an air gap G. The non-oriented core portion 231d corresponds to an area in which the distribution of magnetic flux can be varied according to the position of the mover 232 and the direction of thrust.

The grain-oriented core portion 231c may form the core portion 231c1 in the radial direction and the core portion 231c2 in the reciprocating direction of the outer stator 231a, as in the above-described embodiment. The grain-oriented core portion 231c may form a coil receiving portion 231e receiving to surround the winding coil 233 and may correspond to a region in which the direction of the magnetic flux alternates with each other.

In other words, the pair of core portions 231c1 in the radial direction may be spaced apart from each other with the winding coil 233 interposed therebetween and extend from the non-oriented core portion 231d in the radial direction of the mover. The core portion 231c1 in the radial direction may be formed by stacking the grain-oriented electrical steel which is manufactured so that the rolling direction is formed parallel to the radial direction of the mover.

In addition, the core portion 231c2 in the reciprocating direction extends to connect the pair of core portions 231c1 in the radial direction to each other in the reciprocating direction of the mover and may be formed by stacking the grain-oriented electrical steel which is manufactured so that the rolling direction is formed parallel to the reciprocating direction of the mover.

The invention claimed is:

1. A linear motor, comprising:
    a stator, wherein a winding coil is provided on the stator and a plurality of magnets is coupled to the stator; and
    a mover spaced apart from the stator to reciprocate with respect to the stator, the mover having a mover core made of a magnetic material instead of a permanent magnet, wherein the plurality of magnets is magnetized in a same direction, wherein a fixing groove is formed on an outer circumferential surface of the stator, wherein a portion of a fixing member is inserted into the fixing groove to be supported in an axial direction, wherein at least one of the plurality of magnets is supported in the axial direction by the fixing member, wherein the stator includes an outer stator and an inner stator spaced apart from an inside of the outer stator in a radial direction with the mover interposed between the outer stator and the inner stator, wherein a plurality of air gaps spaced apart from each other in the axial direction is provided between the outer stator and the inner stator, and a central core extending from the inner stator toward the outer stator is formed between the plurality of air gaps, and wherein the plurality of magnets is fixed to both sides of the stator in the axial direction with the center core interposed between the plurality of magnets.

2. The linear motor of claim 1, wherein lengths of the plurality of magnets in the axial direction are equal to each other.

3. The linear motor of claim 2, wherein the lengths of the plurality of magnets between both ends of the plurality of magnets in the axial direction are less than or equal to a length between both ends of the outer stator in the axial direction.

4. The linear motor of claim 3, wherein each of the plurality of magnets is formed in an annular shape.

5. The linear motor of claim 4, wherein the fixing groove is formed in an annular shape on an outer circumferential surface of the inner stator, and wherein the fixing member is formed in an annular shape.

6. The linear motor of claim 1, wherein at least a portion of the central core overlaps with the mover core in the radial direction when the mover moves.

7. The linear motor of claim 6, wherein a length of the central core in the axial direction is less than or equal to a length of one of the plurality of magnets in the axial direction.

8. The linear motor of claim 6, wherein a height of the center core in the radial direction is less than or equal to heights of the plurality of magnets.

9. The linear motor of claim 1, wherein the inner stator comprises a stator main body forming a magnetic path and a central core extending from the stator main body, and wherein a support surface that supports each of the plurality of magnets in the axial direction is stepped at a portion to which the stator main body and the center core are connected.

10. The linear motor of claim 1, wherein a length of the mover core in the axial direction is longer than or equal to a length of the center core in the axial direction.

11. The linear motor of claim 1, wherein a length of the mover core in the axial direction is longer than or equal to a length of one magnet of the plurality of magnets in the axial direction.

12. The linear motor of claim 1, wherein the stator is provided with at least one grain-oriented core portion formed so that an easy direction of magnetization is uniformly distributed and disposed on a path of magnetic flux formed by the winding coil.

13. The linear motor of claim 12, wherein the at least one grain-oriented core portion is provided with a pair of core portions in the radial direction spaced apart from each other with the winding coil interposed between the pair of core portions in the radial direction and extending in a radial direction of the mover and in which the easy direction of magnetization is formed parallel to the radial direction of the mover.

14. The linear motor of claim 13, wherein the at least one grain-oriented core portion further includes a core portion in a reciprocating direction that extends to connect a pair of core portions in the radial direction to each other in the reciprocating direction of the mover and in which the easy direction of magnetization is formed parallel to the reciprocating direction of the mover.

15. The linear motor of claim 14, wherein the pair of core portions in the radial direction is provided with a pair of inclined surfaces inclined in opposite directions to each other to face each other at an outer circumferential side end portion, and wherein the core portion in the reciprocating direction is provided with an inclined coupling surface formed at both end portions to be in surface contact with the pair of inclined surfaces to be coupled thereto.

16. The linear motor of claim 13, wherein at least one the grain-oriented core portion further includes:
- a pair of connecting core portions coupled to an outer circumferential side end portion of the pair of core portions in the radial direction and in which the easy direction of magnetization is formed to be inclined in opposite directions to each other to the easy direction of magnetization of the pair of core portions in the radial direction; and
- a core portion in a reciprocating direction that extends to connect the pair of connecting core portions in the reciprocating direction of the mover and in which the easy direction of magnetization is formed parallel to the reciprocating direction of the mover.

17. A linear compressor, comprising:
- a casing having an inner space;
- a linear motor disposed in the inner space of the casing, a mover reciprocating in the linear motor;
- a piston coupled to the mover of the linear motor to reciprocate together with the mover;
- a cylinder, wherein the piston is inserted into the cylinder to form a compression space;
- a suction valve that opens and closes a suction-side of the compression space; and
- a discharge valve that opens and closes a discharge-side of the compression space, wherein the linear motor includes a linear motor according to claim 1.

18. The linear compressor of claim 17, further comprising:
- an elastic member that elastically supports the piston in the axial direction provided on one side of the piston in the axial direction.

19. A linear motor, comprising:
- a stator, wherein a winding coil is provided on the stator and a plurality of magnets is coupled to the stator; and
- a mover spaced apart from the stator to reciprocate with respect to the stator, the mover having a mover core made of a magnetic material instead of a permanent magnet, wherein the plurality of magnets is magnetized in a same direction, wherein a fixing groove is formed on an outer circumferential surface of the stator, wherein a portion of a fixing member is inserted into the fixing groove to be supported in an axial direction, wherein at least one of the plurality of magnets is supported in the axial direction by the fixing member, wherein the mover is spaced in a radial direction from the stator to be provided with a plurality of air gaps spaced in the axial direction between the stator and the mover, wherein the stator is provided with pole portions on both ends in a reciprocating direction, respectively, and fixed-side core protrusions extending from each of the pole portions toward the mover are formed, respectively, wherein the plurality of magnets is respectively coupled to one side of each of the fixed-side core protrusions in the axial direction, wherein each fixed-side core protrusion is formed to be eccentric toward a center of the stator at both ends of the pole portion, wherein the plurality of magnets is coupled to be supported on outer surfaces of the fixed-side core protrusions, respectively, and wherein a sum of lengths of the fixed-side core protrusions and the plurality of magnets in the axial direction, located on both sides based on the stator center, respectively, are equal to each other.

20. The linear motor of claim 19, wherein the length of each fixed-side core protrusion in the axial direction is greater than or equal to a length of the plurality of magnets in the axial direction.

21. The linear motor of claim 19, wherein the lengths of the plurality of magnets in the axial direction are equal to each other.

22. The linear motor of claim 19, wherein the lengths of the plurality of magnets in the axial direction are different from each other.

23. The linear motor of claim 19, wherein a length of the mover core in the axial direction is larger than a length between the plurality of magnets and contact points with each of the fixed-side core protrusions facing the plurality of magnets, respectively.

24. The linear motor of claim 23, wherein the mover core includes an inner yoke portion in the axial direction forming a magnetic path together with the stator, and a plurality of movable-side core protrusions provided at a distance in the axial direction from the inner yoke portion in the axial direction and extending toward the stator, and wherein each of the plurality of movable-side core protrusions overlaps the contact point in the radial direction, respectively.

25. The linear motor of claim 24, wherein a length of the mover core in the axial direction is equal to or larger than a length of the plurality of fixed-side core protrusions in the axial direction.

26. The linear motor of claim 19, wherein the stator is provided with at least one grain-oriented core portion formed so that an easy direction of magnetization is uniformly distributed and disposed on a path of magnetic flux formed by the winding coil.

27. The linear motor of claim 26, wherein the at least one grain-oriented core portion is provided with a pair of core portions in the radial direction spaced apart from each other with the winding coil interposed between the pair of core portions in the radial direction and extending in the radial direction of the mover and in which the easy direction of magnetization is formed parallel to the radial direction of the mover.

28. The linear motor of claim 27, wherein the at least one grain-oriented core portion further includes a core portion in the reciprocating direction that extends to connect a pair of core portions in the radial direction to each other in the reciprocating direction of the mover and in which the easy direction of magnetization is formed parallel to the reciprocating direction of the mover.

29. The linear motor of claim 28, wherein the pair of core portions in the radial direction is provided with a pair of inclined surfaces inclined in opposite directions to each other to face each other at an outer circumferential side end portion, and wherein the core portion in the reciprocating direction is provided with an inclined coupling surface formed at both end portions to be in surface contact with the pair of inclined surfaces to be coupled thereto.

30. The linear motor of claim 27, wherein the grain-oriented core portion further includes:
- a pair of connecting core portions coupled to an outer circumferential side end portion of the pair of core portions in the radial direction and in which the easy direction of magnetization is formed to be inclined in opposite directions to each other to the easy direction of magnetization of the pair of core portions in the radial direction; and
- a core portion in the reciprocating direction that extends to connect the pair of connecting core portions in a reciprocating direction of the mover and in which the easy direction of magnetization is formed parallel to the reciprocating direction of the mover.

31. A linear compressor, comprising:
- a casing having an inner space;
- a linear motor disposed in the inner space of the casing, a mover reciprocating in the linear motor;
- a piston coupled to the mover of the linear motor to reciprocate together with the mover;
- a cylinder, wherein the piston is inserted into the cylinder to form a compression space;
- a suction valve that opens and closes a suction-side of the compression space; and
- a discharge valve that opens and closes a discharge-side of the compressed space, wherein the linear motor includes a linear motor according to claim 20.

32. The linear compressor of claim 31, further comprising:
- an elastic member that elastically supports the piston in the axial direction is further provided on one side of the piston in a reciprocating direction.

\* \* \* \* \*